(12) United States Patent
Cheng et al.

(10) Patent No.: US 10,968,313 B2
(45) Date of Patent: Apr. 6, 2021

(54) AMINE POLYMER AND PREPARATION METHOD AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Xin Cheng, Beijing (CN); Jianrong Zhang, Beijing (CN); Zuoxin Huang, Beijing (CN); Qinghua Duan, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 67 days.

(21) Appl. No.: 15/780,918

(22) PCT Filed: Nov. 28, 2016

(86) PCT No.: PCT/CN2016/000661
§ 371 (c)(1),
(2) Date: Jun. 1, 2018

(87) PCT Pub. No.: WO2017/092153
PCT Pub. Date: Jun. 8, 2017

(65) Prior Publication Data
US 2018/0362710 A1 Dec. 20, 2018

(30) Foreign Application Priority Data
Dec. 3, 2015 (CN) .......................... 201510881451.5

(51) Int. Cl.
*C10L 1/14* (2006.01)
*C08G 65/331* (2006.01)
(Continued)

(52) U.S. Cl.
CPC ............ *C08G 65/3312* (2013.01); *C08F 8/32* (2013.01); *C08G 63/91* (2013.01);
(Continued)

(58) Field of Classification Search
CPC ...... C10L 1/143; C10L 1/146; C08G 65/3312
See application file for complete search history.

(56) References Cited

U.S. PATENT DOCUMENTS 3,654,370 A 4/1972 Yeakey
4,191,537 A 3/1980 Lewis et al.
(Continued)

FOREIGN PATENT DOCUMENTS

CN 1296520 A 5/2001
CN 1283691 C 11/2006
(Continued)

OTHER PUBLICATIONS

Yao Cheng, "Green Preparation of Polyether Amine as Full Oil Detergent-Dispersant", Dissertation Submitted to Southeast University for the Academic Degree of Master of Engineering, May 11, 2010, Southeast University.
(Continued)

*Primary Examiner* — Ellen M McAvoy
*Assistant Examiner* — Ming Cheung Po
(74) *Attorney, Agent, or Firm* — Novick, Kim & Lee, PLLC; Allen Xue

(57) ABSTRACT

The present invention relates to an amino polymer, its main chain is attached via a —O— group to a structure represented by the following formula (I). The present invention
(Continued)

also relates to a process for producing said amino polymer and to its use as fuel oil detergent. Compared with the prior art, the fuel oil detergent of the present invention has the advantages such as a lower manufacturing cost and an improved deposit formation inhibition performance.

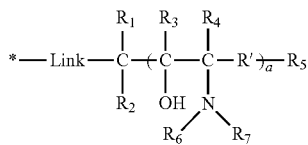

(I)

In formula (I), groups and values are defined as described in the description.

16 Claims, 6 Drawing Sheets

(51) Int. Cl.
| | |
|---|---|
| *C08G 65/325* | (2006.01) |
| *C08G 65/333* | (2006.01) |
| *C10L 10/04* | (2006.01) |
| *C08G 63/91* | (2006.01) |
| *C08G 65/26* | (2006.01) |
| *C08F 8/32* | (2006.01) |
| *C10L 10/18* | (2006.01) |
| *C08G 65/324* | (2006.01) |
| *C10L 1/2387* | (2006.01) |
| *C10L 1/16* | (2006.01) |
| *C10L 1/198* | (2006.01) |

(52) U.S. Cl.
CPC ....... *C08G 65/2606* (2013.01); *C08G 65/324* (2013.01); *C08G 65/325* (2013.01); *C08G 65/3255* (2013.01); *C08G 65/331* (2013.01); *C08G 65/3311* (2013.01); *C08G 65/33303* (2013.01); *C08G 65/33306* (2013.01); *C10L 1/143* (2013.01); *C10L 1/146* (2013.01); *C10L 1/2387* (2013.01); *C10L 10/04* (2013.01); *C10L 10/18* (2013.01); *C10L 1/1616* (2013.01); *C10L 1/1641* (2013.01); *C10L 1/1985* (2013.01); *C10L 2200/0438* (2013.01); *C10L 2230/083* (2013.01); *C10L 2270/023* (2013.01)

(56) References Cited

U.S. PATENT DOCUMENTS

| | | | |
|---|---|---|---|
| 4,208,345 A | 6/1980 | Amati | |
| 4,332,595 A | 6/1982 | Herbstman et al. | |
| 4,696,755 A | 9/1987 | Campbell | |
| 4,766,245 A | 8/1988 | Larkin et al. | |
| 5,003,107 A | 3/1991 | Zimmerman et al. | |
| 5,112,364 A | 5/1992 | Rath et al. | |
| 5,130,358 A * | 7/1992 | Danner ............... | B01F 17/0085 524/140 |
| 5,264,006 A | 11/1993 | Schilowitz et al. | |
| 5,660,601 A | 8/1997 | Oppenlander et al. | |
| 5,752,991 A | 5/1998 | Plavac | |
| 5,789,490 A | 8/1998 | Chang | |
| 5,851,242 A | 12/1998 | Cherpeck et al. | |
| 6,193,767 B1 | 2/2001 | Arters et al. | |
| 6,217,624 B1 | 4/2001 | Morris et al. | |
| 6,267,791 B1 | 7/2001 | Thomas et al. | |
| 6,372,000 B1 | 4/2002 | DeRosa et al. | |
| 6,548,461 B1 | 4/2003 | Oppenlander et al. | |
| 7,704,289 B2 | 4/2010 | Arters et al. | |
| 7,919,656 B2 | 4/2011 | Qi et al. | |
| 2005/0027141 A1 | 2/2005 | Furushima et al. | |
| 2005/0172544 A1 | 8/2005 | Macduff et al. | |
| 2005/0215441 A1 | 9/2005 | Machney et al. | |

FOREIGN PATENT DOCUMENTS

| | | | |
|---|---|---|---|
| CN | 1997707 A | 7/2007 | |
| CN | 101220116 A | 7/2008 | |
| CN | 101225332 A | 7/2008 | |
| CN | 101565377 A | 10/2009 | |
| CN | 101565479 A | 10/2009 | |
| CN | 102725383 A | 10/2012 | |
| CN | 102627762 B | 8/2013 | |
| CN | 103328537 A | 9/2013 | |
| CN | 104024385 A | 9/2014 | |
| EP | 0310875 A1 | 4/1989 | |
| EP | 0752461 A1 | 1/1997 | |
| EP | 0902079 A1 | 9/1998 | |
| EP | 0887401 A1 | 12/1998 | |
| EP | 0962479 A1 | 12/1999 | |
| GB | 2269384 A | 2/1994 | |
| JP | H07278577 A | 10/1995 | |
| RU | 2112014 C1 | 5/1998 | |
| WO | 2014066344 A1 | 5/2014 | |

OTHER PUBLICATIONS

Yuejiang Zhang et al., "Two-step Catalytic Synthesis of Random Allyl Polyether Research", Fine Chemical Intermediates, Aug. 2009, vol. 39, No. 4, pp. 61-64.

Jinlong Zhang et al., "Synthesis and Application of Polyetheramine as Gasoline Detergent", Petroleum Processing and Petrochemicals, vol. 40, No. 7, pp. 40-43 (English abstract on the last page).

Jinlong Zhang et al., "Advance in Research on Polyetheramine Gasoline Detergent", Speciality Petrochemicals, May 2011, No. 80, pp. 80-84, (English abstract on the last page).

Xiao-Tong Li et al., "Selection of Alkoxidation Reagents in Preparation of Allyl-Terminated Polyether Polyols and Study on Purification of Product", Chemical Propellants & Polymeric Materials, vol. 3, No. 3, 2005, pp. 21-23 (English abstract on the last page).

Biyao Wu et al, "Synthesis of terminal epoxy polyether", Fine Chemicals, vol. 6, 1989, pp. 44-46, 50.

Min Chen et al., "Development of Synthesis and Application of Amine-Terminated Polyether", Plastics Additives, 2013 vol. 98, No. 2, pp. 6-11.

Zaihui Dong et al., "The Study of the Synthesis and Application about Polyether Amines Purification of Petrol", Chemical Intermediate, 2008, No. 8, pp. 54-56.

Yan-Hong Yin et al., "Advance in the Etherified Alkyl-capped Polyther", Fine Chemicals, 2002, vol. 19 Supplemental, Aug. 2002, pp. 19-22, 29.

Yin-Chang Xin et al., "Synthesis and Application of Alkenyl Polyether", Fine and Specialty Chemicals, Sep. 6, 2007, vol. 15, No. 17, pp. 17-19, 28.

RU patent office, Search Report for RU 2018123936, dated Mar. 3, 2020.

* cited by examiner

AMINE POLYMER AND PREPARATION METHOD AND USE THEREOF

TECHNICAL FIELD

The invention relates to the field of functional materials, in particular to an amino polymer. The invention also relates to a process for preparing the amino polymer and its use as, for example, a fuel oil detergent.

BACKGROUND TECHNOLOGY

Unsaturated olefins, aromatic hydrocarbons and small amounts of sulfur compounds in fuel oil easily react with oxygen to form colloids and eventually form carbon deposits, especially the generation of the deposits in engines may be accelerated at critical parts such as intake valves, nozzles, and combustion chambers, seriously affecting the engine's working performance, leading to engine startup difficulties, idling instability, poor driving, poor acceleration, serious power loss and other issues. In order to suppress the generation of such deposits in engines, many detergents have been developed in the art.

U.S. Pat. No. 5,112,364 discloses a process for the production of polyetheramines by polyoxybutylene ether amination of nonylphenol in the presence of nickel-containing catalysts, and said polyetheramines can be used as fuel oil detergents. However, said prior process has a defect that the cost of producing the polyetheramine is high, and the polyetheramine cannot be sufficient in terms of deposit generation inhibition performance when it is used as a fuel oil detergent.

SUMMARY OF THE INVENTION

The present inventors, on the basis of the prior art, have found a novel amino polymer, and further have found that, by using the amino polymer to produce a detergent (e.g. a detergent base), the aforesaid problems encountered by the prior art can be solved, and then this invention is achieved.

Specifically, the present invention relates to an amino polymer, in which a main chain of the amino polymer is bonded to a structure represented by the following formula (I) through an —O— group,

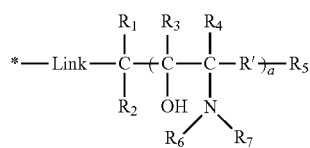

wherein, * represents a bond bonded to —O— group; the group Link represents a linking group, selected from a single bond and $C_{1\text{-}10}$ hydrocarbylene (preferably $C_{1\text{-}6}$ linear or branched alkylene, further preferably $C_{1\text{-}4}$ linear or branched alkylene); the groups $R_1$ and $R_2$, identical to or different from each other, are each independently selected from hydrogen and $C_{1\text{-}10}$ hydrocarbyl (preferably $C_{1\text{-}6}$ linear or branched alkyl, further preferably $C_{1\text{-}4}$ linear or branched alkyl); a groups $R_3$ or a groups $R_4$, identical to or different from each other, are each independently selected from hydrogen and $C_{1\text{-}10}$ hydrocarbyl (preferably $C_{1\text{-}6}$ linear or branched alkyl, further preferably $C_{1\text{-}4}$ linear or branched alkyl); a groups $R_6$ or a groups $R_7$, identical to or different from each other, are each independently selected from hydrogen, optionally substituted $C_{1\text{-}10}$ hydrocarbyl (preferably optionally substituted $C_{1\text{-}6}$ linear or branched alkyl, further preferably optionally substituted $C_{1\text{-}4}$ linear or branched alkyl) and

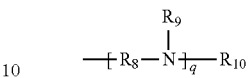

(wherein, q groups $R_8$, identical to or different from each other, are each independently selected from $C_{1\text{-}40}$ hydrocarbylene, preferably $C_{1\text{-}40}$ linear or branched alkylene, more preferably $C_{1\text{-}20}$ linear or branched alkylene, further preferably $C_{2\text{-}6}$ linear or branched alkylene; q groups $R_9$, identical to or different from each other, are each independently selected from hydrogen and $C_{1\text{-}10}$ hydrocarbyl (preferably $C_{1\text{-}6}$ linear or branched alkyl, further preferably $C_{1\text{-}4}$ linear or branched alkyl); the group $R_{10}$ is selected from hydrogen and $C_{1\text{-}10}$ hydrocarbyl (preferably $C_{1\text{-}6}$ linear or branched alkyl, further preferably $C_{1\text{-}4}$ linear or branched alkyl); q is an integer between 1 and 50, preferably an integer between 1 and 10, more preferably 1, 2, 3 or 4); a is an integer between 1 and 10, preferably an integer between 1 and 4, more preferably 1, 2 or 3; a groups R', identical to or different from each other, are each independently selected from a single bond and $C_{1\text{-}10}$ hydrocarbylene (preferably $C_{1\text{-}6}$ linear or branched alkylene, further preferably $C_{1\text{-}4}$ linear or branched alkylene, more preferably methylene or ethylene); the group $R_5$ is selected from hydrogen and $C_{1\text{-}10}$ hydrocarbyl (preferably $C_{1\text{-}6}$ linear or branched alkyl, further preferably $C_{1\text{-}4}$ linear or branched alkyl).

The invention also relates to a process for preparing said amino polymer and its use as a fuel oil detergent.

More specifically, the present invention relates to the following aspects.

1. A polyetheramine compound, having a structure of:

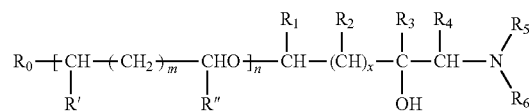

wherein $R_0$ is selected from hydrogen atom, hydroxyl, C1-C20alkyl or phenyl bonded to C1-C20alkyl; n is the polymerization degree of the polyether chain and is an integer between 1 and 100; R' and R" in each polymer unit containing a polyether segment are each independently selected from hydrogen or $C_{1\text{-}6}$ alkyl; m is an integer between 0 and 10; $R_1$, $R_2$, $R_3$ and $R_4$ are each independently selected from hydrogen or $C_{1\text{-}6}$alkyl; x is an integer between 0 and 10; $R_5$ and $R_6$ are each independently selected from hydrogen, $C_{1\text{-}6}$alkyl or

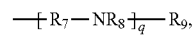

wherein $R_7$ is $C_{1\text{-}40}$alkyl; $R_8$ and $R_9$ are each independently selected from hydrogen or $C_{1\text{-}6}$alkyl; q is an integer between 1 and 50.

2. The polyetheramine compound according to the preceding aspect, which is characterized in that said $R_0$ is methyl or hydroxyl; n is an integer between 5 and 80; R', R"

are each independently selected from $C_{1-4}$alkyl; m is an integer between 0 and 8; $R_1$, $R_2$, $R_3$ and $R_4$ are each independently selected from hydrogen or $C_{1-4}$alkyl; x is an integer between 0 and 6; $R_5$ and $R_6$ are each independently selected from

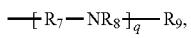

wherein $R_7$ is $C_{1-20}$alkyl; $R_8$, $R_9$ are each independently selected from hydrogen or methyl; q is an integer between 1 and 10.

3. The polyetheramine compound according to any of the preceding aspects, which is characterized in that the polyetheramine has a molecular weight of 500-10000.

4. A process for preparing a polyetheramine compound, comprising the following steps:
1) Reacting an alkenyl alcohol with an epoxide to produce an alkenyl polyether;
2) Reacting the product of step (1) with an oxidant;
3) Reacting the product of step (2) with an organic amine or an inorganic ammonium, and collecting the product.

5. The process according to any one of the preceding aspects, which is characterized in that said alkenyl alcohol has a structure of:

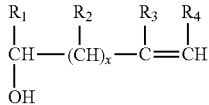

Wherein $R_1$, $R_2$, $R_3$ and $R_4$ are each independently selected from hydrogen or $C_{1-6}$alkyl; said epoxide has a structure of:

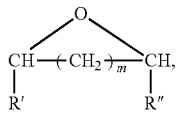

wherein R', R" are each independently selected from hydrogen or $C_{1-6}$alkyl; m is an integer between 0 and 10.

6. The process according to any one of the preceding aspects, which is characterized in that said epoxide is selected from one or more of ethylene oxide, propylene oxide, butylene oxide, pentene oxide and hexylene oxide.

7. The process according to any one of the preceding aspects, which is characterized in that in step (1), the molar ratio of the alkenyl alcohol to the epoxide is 1:1-100.

8. The process according to any one of the preceding aspects, which is characterized in that in step (1), the reaction temperature is 100-200° C., and the reaction pressure is 1-5 kg.

9. The process according to any one of the preceding aspects, which is characterized in that in step (1), said alkenyl alcohol is selected from allyl alcohol, 3-buten-1-ol, 3-buten-2-ol, 3-methyl-3-buten-1-ol, 4-penten-1-ol, 4-penten-2-ol, 4-penten-3-ol, 3-methyl-4-penten-1-ol, 2-methyl-4-penten-1-ol, 3-ethyl-4-penten-1-ol, 2-ethyl-4-penten-1-ol, 3-isobutyl-4-penten-1-ol, 2-isobutyl-4-penten-1-ol, 2,3-dimethyl-4-penten-1-ol, 2,2-dimethyl-4-penten-1-ol, 3,3-dimethyl-4-penten-1-ol, 5-hexen-1-ol, 4-methyl-5-hexenol, 3-methyl-5-hexenol, 2-methyl-5-hexenol, 3-ethyl-5-hexenol, 5-hexen-2-ol, 5-hexen-3-ol, 5-hexen-4-ol, 6-hepten-1-ol, 2-methyl-6-hepten-1-ol, 3-methyl-6-hepten-1-ol, 4-methyl-6-hepten-1-ol, 5-methyl-6-hepten-1-ol, 2-ethyl-6-hepten-1-ol, 3-ethyl-6-hepten-1-ol, 4-ethyl-6-hepten-1-ol, 5-ethyl-6-hepten-1-ol, 2-methyl-7-octen-1-ol, 3-methyl-7-octen-1-ol, 4-methyl-7-octen-1-ol, 5-methyl-7-octen-1-ol, 6-methyl-7-octen-1-ol, 3-ethyl-7-octen-1-ol, 9-decen-1-ol, 10-undecen-1-ol, 11-dodecen-1-ol, and a mixture thereof.

10. The process according to any one of the preceding aspects, which is characterized in that in step (1), a catalyst is added, said catalyst is an alkaline catalyst, the molar ratio of said catalyst to said alkenyl alcohol is 0.01-0.1:1.

11. The process according to any one of the preceding aspects, which is characterized in that in step (2), said oxidant is one or more selected from an organic peroxo acid, hydrogen peroxide, sodium hypochlorite, ammonium peroxodisulfate, benzoyl peroxide, N-methyl morpholine oxide, methyl ruthenium oxide, osmium tetroxide, hypochlorous acid, $KMnO_4$, $K_2Cr_2O_7$, $KNO_3$, $Na_2O_2$, $MnO_2$, ozone and oxygen.

12. The process according to any one of the preceding aspects, which is characterized in that said organic peroxo acid is selected from $C_3$-$C_{12}$ organic peroxo acids.

13. The process according to any one of the preceding aspects, which is characterized in that said organic peroxo acid is selected from performic acid, peracetic acid, peroxypropionic acid, peroxybutyric acid, tert-butyl hydroperoxide, peroxybenzoic acid, meta-chloroperoxybenzoic acid and a mixture thereof.

14. The process according to any one of the preceding aspects, which is characterized in that the molar ratio of said oxidant to the alkenyl alcohol in step (1) is 1-10:1.

15. The process according to any one of the preceding aspects, which is characterized in that in step (2), the reaction temperature is 20-80° C., the reaction time is 1 h-8 h.

16. The process according to any one of the preceding aspects, which is characterized in that in step (2), a catalyst is added, said catalyst is selected from a molecular sieve, an organic acid or an inorganic acid.

17. The process according to any one of the preceding aspects, which is characterized in that in step (3), said organic amine is one or more of polyene polyamines and $C_1$-$C_{30}$ primary amines, secondary amines, and alcohol amines.

18. The process according to any one of the preceding aspects, which is characterized in that in step (3), said inorganic ammonium is one or more of ammonia gas, ammonia solution and an inorganic ammonium salt.

19. The process according to any one of the preceding aspects, which is characterized in that in step (3), a solvent is added, said solvent is a $C_1$-$C_8$alcohol.

20. The process according to any one of the preceding aspects, which is characterized in that in step (3), a catalyst is added, said catalyst is a tertiary amine or a phenolic material.

21. The process according to any one of the preceding aspects, which is characterized in that said tertiary amine is selected from trihydrocarbyl tertiary amines having a molecular weight of 10-500 and an amino derivative thereof.

22. The process according to any one of the preceding aspects, which is characterized in that said tertiary amine is selected from trimethylamine, triethylamine, tripropylamine, N,N-dimethylethylamine, N,N-dimethylpropylamine, N,N-dimethylbutylamine, N,N-diethylpropylamine, N,N-dipropyl-1-propylamine, N,N-diethylbutylamine, N,N-dimethyl-1,2-ethylene diamine, N,N-dimethyl-1,3-propylene diamine, N,N-dimethylpentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-diethylpentylamine, N,N-diethylhexylamine, N,N-diethylheptylamine, N,N-diethyloctylamine, N,N-diethylnonylamine, N,N-diethyldecylamine, N,N-diethylundecylamine, N,N-diethyldodecylamine, N,N-dipropylbutylamine, N,N-dipropylpentylamine, N,N-dipropylhexylamine, N,N-dipropylheptylamine, N,N-dipropyloctylamine, N,N-dipropylnonylamine, N,N-dipropyldecylamine, N,N-dipropylundecylamine, N,N-dipropyldodecylamine, triphenylamine, N,N-dimethylbenzylamine and a mixture thereof; said phenolic material is monohydric phenols, dihydric phenols, polyhydric phenols or sodium phenols having a molecular weight of 20-500.

23. The process according to any one of the preceding aspects, which is characterized in that said phenolic material is selected from phenol, sodium phenoxide, hydroquinone, sodium benzene-1,4-bis(olate), o-cresol, sodium o-cresolate, m-cresol, sodium m-cresolate, p-cresol and sodium p-cresolate, 2,4-dimethylphenol, 2,4,6-trimethylphenol, ethyl phenol, sodium ethylphenoxide, 2,4-diethylphenol, 2,4,6-triethylphenol, p-methoxyphenol, m-methoxyphenol, o-methoxyphenol, sodium p-methoxy phenoxide, sodium m-methoxy phenoxide, sodium o-methoxy phenoxide, phenylphenol, sodium phenylphenoxide, and a mixture thereof.

24. The process according to any one of the preceding aspects, which is characterized in that in step (3), the reaction temperature is 100-180° C., the reaction time is 1 h-8 h.

25. Use of the polyetheramine compound according to any of the preceding aspects, or the polyetheramine compound prepared by the process according to any one of the preceding aspects as fuel oil detergent.

TECHNICAL EFFECT

The amino polymer according to the present invention can achieve improved deposit formation inhibition performance when used as a fuel oil detergent, compared with the prior art.

The manufacturing cost for the amino polymer of the present invention is lower compared with the prior art.

DETAILED DESCRIPTION

Figure 1:
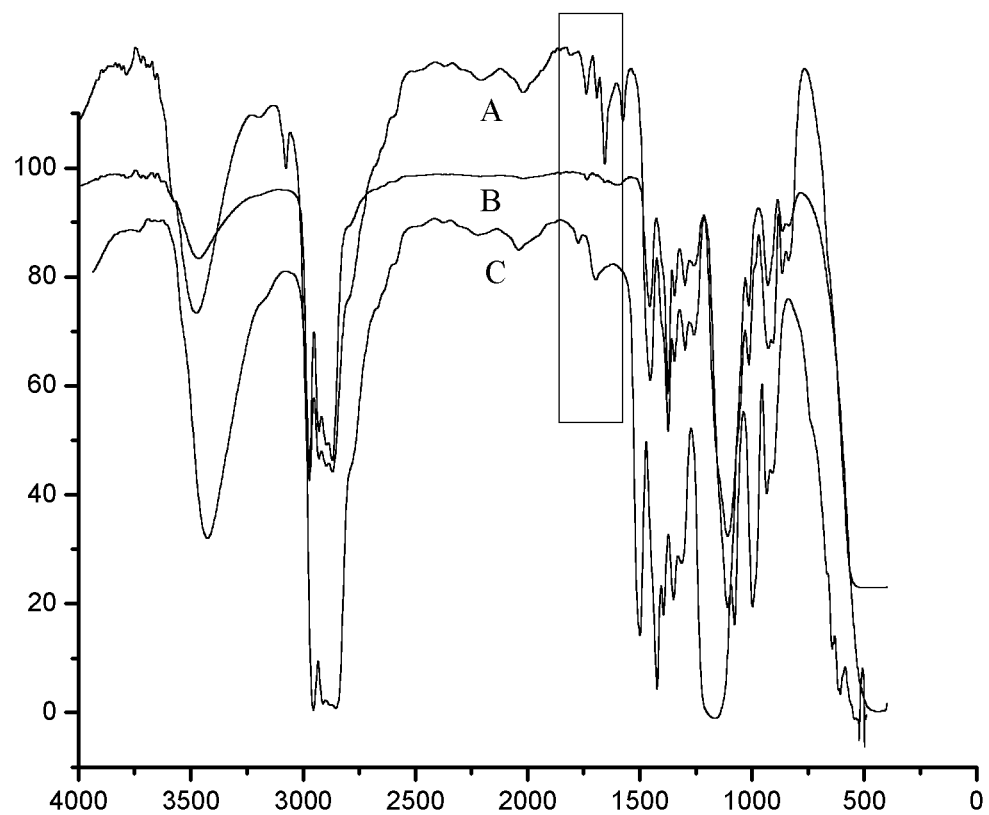
FIG. 1 is a comparison graph of the infrared spectrum of alkenyl polyether, epoxy polyether, and polyetheramine in Example 1. In the figure, curves A, B, and C in order from top to bottom respectively represent the infrared spectrum of alkenyl polyether, epoxy polyether, and polyetheramine.

The specific embodiments of the present invention will be described in detail below, but it should be pointed out that the protection scope of the present invention is not limited by these specific embodiments but determined by the appended claims.

All publications, patent applications, patents, and other references mentioned in this specification are herein incorporated by reference. Unless otherwise indicated, all technical and scientific terms used herein have the same meaning as commonly understood by those skilled in the art. In the event of conflict, the definitions in the present specification shall prevail.

When the specification discusses a material, a substance, a method, a step, a device, or a component and the like with reference to the expressions such as "known to those skilled in the art", "prior art" or its synonym, the objects involved by these expressions not only cover those commonly used in the art when the application was filed, but also include those that are not commonly used now, but will become suitable for similar purposes as recognized in the art.

In the context of this specification, any matters not mentioned can be directly practiced according to those known in the art without need of any modification. Moreover, any of the embodiments described herein can be freely combined with one or more other embodiments described herein, and the technical solutions or technical ideas formed thereby are all considered to be part of the original disclosure of the present invention, and should not be regarded as new matter that has been neither disclosed nor expected in the present invention, unless the skilled person thinks that the combination is obviously unreasonable.

Finally in the absence of a clear indication, all percentages, parts, ratios, and the like mentioned in the present specification are based on weight, unless they do not meet the conventional knowledge of those skilled in the art if being based on the weight. Although methods and materials similar or equivalent to those described herein can be used in the practice or testing of the present invention, suitable methods and materials have been described herein.

In the context of the present specification, the expression "halogen" refers to fluorine, chlorine, bromine or iodine.

In this specification, the term "single bond" is sometimes used in the group definition. The so-called "single bond" means that the group does not exist. For example, assuming of the structure formula —CH$_2$-A-CH$_3$, wherein the group A is defined as a group selected from a single bond and methyl. In view of this, if A is a single bond, it means that the group A does not exist and the structure formula should be simplified to —CH$_2$—CH$_3$.

In the context of the present specification, unless specifically stated otherwise, the so-called "optionally substituted" refers to being optionally substituted by one or more (e.g., 1-5, 1-4, 1-3, 1-2 or 1) substitutent(s) selected from hydroxyl, amino, $C_{1-20}$ linear or branched alkyl, $C_{5-10}$ monocyclic or polycyclic cycloalkyl, $C_{2-20}$ linear or branched alkenyl and $C_{6-20}$aryl. As $C_{1-20}$ linear or branched alkyl, $C_{1-10}$ linear or branched alkyl, $C_{1-6}$ linear or branched alkyl or $C_{1-4}$ linear or branched alkyl, for example, methyl or ethyl can be exemplified. As $C_{5-10}$ monocyclic or polycyclic cycloalkyl, $C_{5-8}$ monocyclic or polycyclic cycloalkyl or $C_{5-7}$ monocyclic or polycyclic cycloalkyl, for example, cyclopentyl or cyclohexyl can be exemplified. As $C_{2-20}$ linear or branched alkenyl, $C_2$-10 linear or branched alkenyl or $C_{2-4}$ linear or branched alkenyl, for example, ethenyl, propenyl or allyl can be exemplified. As $C_{6-20}$aryl, $C_{6-10}$aryl, for example, phenyl or naphthyl can be exemplified. As the substituent, hydroxyl or $C_{1-4}$ linear or branched alkyl is preferable.

In the context of the present specification, unless specifically stated otherwise, the number-average molecular weight (Mn) is determined by gel permeation chromatography (GPC).

In the context of the present specification, unless specifically stated otherwise, the measuring conditions of gel permeation chromatography (GPC) or GPC spectrum involved are: Instrument: Waters company, USA, Waters 2695-type gel permeation chromatograph analyzer; the mobile phase is tetrahydrofuran, the flow rate is 1 mL/min, the column temperature is 35° C., the elution time is 40 min, and the sample mass fraction is 0.16%-0.20%.

The present invention relates to an amino polymer. Said amino polymer has a polymer main chain, and said polymer main chain is attached via a —O— group to a structure represented by the following formula (I). Herein, said —O— group is on said polymer main chain, and constitutes part of said polymer main chain. Due to this attachment manner, the structure represented by formula (I) is pendent on said polymer main chain in form of end groups, side chains or both.

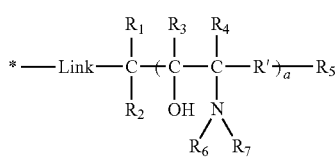

(I)

According to the present invention, in formula (I), * represents a bond bonded to —O— group. Specifically, the structure represented by formula (I) forms a covalent bond by combining the free bond at the location as shown by * with the —O— group on said polymer main chain and thus attaches to said polymer main chain via the —O— group. According to the present invention, in formula (I), the group Link represents a linking group, selected from a single bond and $C_{1-10}$ hydrocarbylene. Herein, $C_{1-10}$ linear or branched alkylene, $C_{2-10}$ linear or branched alkenylene and $C_{2-10}$ linear or branched alkynylene, preferably $C_{1-6}$ linear or branched alkylene, further preferably $C_{1-4}$ linear or branched alkylene can be exemplified as $C_{1-10}$ hydrocarbylene.

According to the present invention, in formula (I), the groups $R_1$ and $R_2$, identical to or different from each other, are each independently selected from hydrogen and $C_{1-10}$ hydrocarbyl. Herein, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified as $C_{1-10}$ hydrocarbyl.

According to the present invention, in formula (I), there are a groups $R_3$ and a groups $R_4$. Herein, said a groups $R_3$ or said a groups $R_4$, identical to or different from each other, are each independently selected from hydrogen and $C_{1-10}$ hydrocarbyl. Herein, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified as $C_{1-10}$ hydrocarbyl.

According to the present invention, in formula (I), there are a groups $R_6$ and a groups $R_7$. Herein, said a groups $R_6$ or said a groups $R_7$, identical or different each other, are each independently selected from hydrogen, optionally substituted $C_{1-10}$ hydrocarbyl and

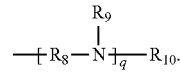

Herein, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified as $C_{1-10}$ hydrocarbyl.

According to a preferable embodiment of the present invention, in formula (I), in the definition of the group $R_6$ or $R_7$, the so-called "optionally substituted" preferably refers to being substituted by one or more (e.g., 1-5, 1-4, 1-3, 1-2 or 1) hydroxyl groups.

According to the present invention, in the formula of

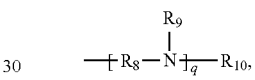

there are q groups $R_8$. Herein, said q groups $R_8$, identical or different each other, are each independently selected from $C_{1-40}$ hydrocarbylene. $C_{1-40}$ linear or branched alkylene, $C_{2-40}$ linear or branched alkenylene and $C_{2-40}$ linear or branched alkynylene, preferably $C_{1-40}$ linear or branched alkylene, more preferably $C_{1-20}$ linear or branched alkylene, further preferably $C_{2-6}$ linear or branched alkylene can be exemplified as $C_{1-40}$ hydrocarbylene.

According to the present invention, in the formula of

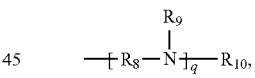

there are q groups $R_9$. Herein, said q groups $R_9$, identical or different each other, are each independently selected from hydrogen and $C_{1-10}$ hydrocarbyl. Herein, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified as $C_{1-10}$ hydrocarbyl.

According to the present invention, in the formula of

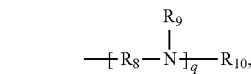

the group $R_{10}$ is selected from hydrogen and $C_{1-10}$ hydrocarbyl. Herein, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified as $C_{1-10}$ hydrocarbyl.

According to the present invention, in the formula of

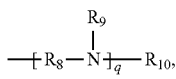

q is an integer between 1 and 50, preferably an integer between 1 and 10, more preferably 1, 2, 3 or 4.

According to the present invention, in formula (I), a is an integer between 1 and 10, preferably an integer between 1 and 4, more preferably 1, 2 or 3.

According to the present invention, in formula (I), there are a groups R'. Herein, said a groups R', identical or different each other, are each independently selected from a single bond and $C_{1-10}$ hydrocarbylene. Herein, $C_{1-10}$ linear or branched alkylene, $C_{2-10}$ linear or branched alkenylene and $C_{2-10}$ linear or branched alkynylene, preferably $C_1$-6 linear or branched alkylene, further preferably $C_{1-4}$ linear or branched alkylene, more preferably methylene or ethylene can be exemplified as $C_{1-10}$ hydrocarbylene.

According to the present invention, in formula (I), the group $R_5$ is selected from hydrogen and $C_{1-10}$ hydrocarbyl. Herein, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified as $C_{1-10}$ hydrocarbyl.

According to an embodiment of the present invention, said amino polymer has a structure represented by the following formula (II).

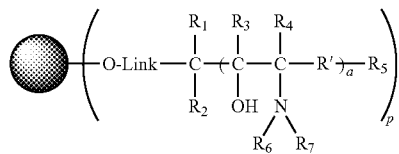

According to the present invention, in formula (II), the group

and p —O— groups together represent the main chain of said amino polymer. Therefore, the group

and the —O— group are a part of the main chain of the amino polymer of the present invention.

According to the present invention, in formula (II), p is an integer between 1 and 10, preferably an integer between 1 and 3, more preferably 1.

According to the present invention, in formula (II), other groups and numberic values are defined as described in said formula (I). Herein, it should be noted that according to the present invention, p pendant groups

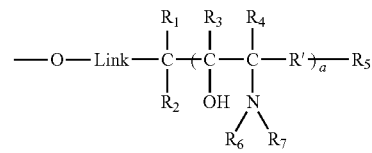

are independent of each other, and each group and each numberic value in these pendant groups may be defined independently each other in these pendant groups and are independently defined as described in formula (I).

According to the present invention, the main chain of said amino polymer (also called skeleton structure) has a structure obtained by removing from a hydroxyl polymer having p' hydroxyl groups the hydrogen atoms of p hydroxyl groups (p free —O— groups remain). Herein, p' is an integer between 1 and 10, preferably an integer between 1 and 3, more preferably 1. p is an integer between 1 and 10, preferably an integer between 1 and 3, more preferably 1, and 1≤p≤p'. Correspondingly, the group

has a structure obtained by removing from a hydroxyl polymer having p' hydroxyl groups p hydroxyl groups (p free bonds remain).

According to the present invention, for example, said amino polymer may have the following exemplary structure. In the following structure, X-1 and X-2 represent side chains, X-3 represents an end group, ∼∼ represents a polymer main chain.

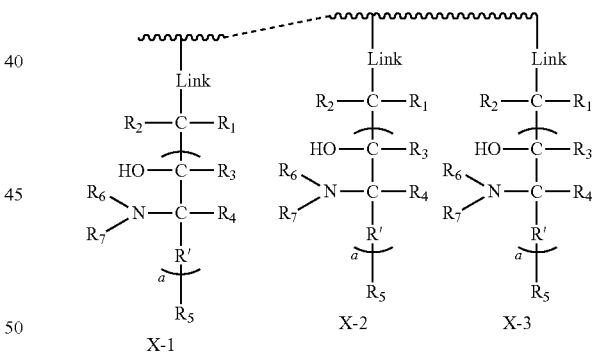

According to the present invention, as the parent polymer of the amino polymer, said hydroxyl polymer can be those conventionally used in the design of fuel oil detergents in the art, including but not limited to polyesters, polyethers, enol polymers and the like. More specifically, as the hydroxyl polymer having p' hydroxyl groups, for example, a polyester having the corresponding number of free hydroxyl groups and a polyether having the corresponding number of free hydroxyl groups, preferably a polyether having the corresponding number of free hydroxyl groups, can be exemplified.

According to the present invention, as said polyester having the corresponding number of free hydroxyl groups, for example, a polyester having hydroxyl group(s) at one or two terminal ends of the marcomolecular chain, or a polyester having more hydroxyl groups obtained by using comonomer such as polyhydric alcohol can be exemplified. The structure and the preparation method of said polyester having the corresponding number of free hydroxyl groups are well known in the art and will not be addressed herein.

According to the present invention, as said polyether having the corresponding number of free hydroxyl groups, for example, a polyether having hydroxyl group(s) at one or two terminal ends of the marcomolecular chain, or a polyether having more hydroxyl groups obtained by using comonomer such as polyhydric alcohol can be exemplified.

According to an embodiment of the present invention, as said polyether having the corresponding number of free hydroxyl groups, alkylene diol polymer can be particularly exemplified. Herein, as said alkylene diol polymer, for example, a polymer obtained by homopolymerizing or copolymerizing alkylene oxide, alkylene glycol or oxacycloalkane can be exemplified. In the process of said homopolymerization or copolymerization, a comonomer can be introduced as desired. Herein, as said alkylene oxide, for example, alkylene oxide represented by the following formula (A-IV) can be exemplified; more specifically, ethylene oxide, propylene oxide, butylene oxide, pentylene oxide and hexylene oxide, preferably ethylene oxide and propylene oxide can be exemplified. As said alkylene glycol, for example, a compound represented by the following formula (A-IV') can be exemplified; more specifically, ethylene glycol, propylene glycol, butylene glycol, pentylene glycol and hexylene glycol, preferably ethylene glycol and propylene glycol can be exemplified. As said oxacycloalkane, for example, a cyclic ether represented by the following formula (A-IV") can be exemplified; more specifically, oxetane and oxirane can be exemplified. As said comonomer, for example, polyhydric alcohol except dihydric alcohol, such as glycerol and pentaerythritol, preferably glycerol can be exemplified.

(A-IV)

According to this embodiment of the present invention, in the formula (A-IV), the group Ru' is selected from a single bond and $C_{1-22}$ linear or branched alkyl. Herein, as $C_{1-22}$ linear or branched alkyl, for example, $C_{1-20}$ linear or branched alkyl, $C_{1-10}$ linear or branched alkyl or $C_{1-4}$ linear or branched alkyl, preferably methyl can be exemplified.

HO—Ru"—OH  (A-IV')

According to this embodiment of the present invention, in the formula (A-IV'), the group Ru" is selected from $C_{2-22}$ linear or branched alkyl. Herein, as $C_{2-22}$ linear or branched alkyl, for example, $C_{2-20}$ linear or branched alkyl, $C_{2-10}$ linear or branched alkyl or $C_{2-6}$ linear or branched alkyl, preferably ethyl or propyl can be exemplified.

(A-IV")

According to this embodiment of the present invention, in the formula (A-IV"), the group Ru''' is selected from $C_{3-22}$ linear or branched alkyl. Herein, as $C_{3-22}$ linear or branched alkyl, for example, $C_{3-20}$ linear or branched alkyl, $C_{3-10}$ linear or branched alkyl or $C_{3-6}$ linear or branched alkyl, preferably propyl can be exemplified.

According to this embodiment of the present invention, as said alkylene diol polymer, a polyether represented by the following formula (III) can be more specifically exemplified.

$$R_0\text{-}(\text{O}\text{-}Ru)_y\text{OH} \quad (III)$$

According to this embodiment of the present invention, in the formula (III), the group $R_0$ is selected from hydrogen atom and optionally substituted $C_{1-50}$ hydrocarbyl. Herein, as $C_{1-50}$ hydrocarbyl, for example, $C_{1-50}$ linear or branched alkyl, $C_{2-50}$ linear or branched alkenyl, $C_{2-50}$ linear or branched alkynyl, $C_{6-50}$ monocyclic or polycyclic aryl and $C_{3-50}$ monocyclic or polycyclic cycloalkyl can be exemplified; more specifically, $C_{1-20}$ linear or branched alkyl, $C_{6-10}$ monocyclic or polycyclic aryl and $C_{3-20}$ monocyclic or polycyclic cycloalkyl (or $C_{5-7}$ monocyclic or polycyclic cycloalkyl), in particular $C_{5-15}$ linear or branched alkyl, phenyl and cyclohexyl can be exemplified.

According to a preferred embodiment of the present invention, in formula (III), in the definition of the group $R_0$, the so-called "optionally substituted" preferably refers to being substituted by one or more (e.g., 1-5, 1-4, 1-3, 1-2 or 1) $C_{1-20}$ linear or branched alkyl, preferably by one or more (e.g., 1-5, 1-4, 1-3, 1-2 or 1) $C_{5-15}$ linear or branched alkyl. Herein, as said group $R_0$, for example, dodecylphenyl or nonylphenyl can be exemplified.

According to an embodiment of the present invention, in formula (III), there are y Ru groups. Herein, said y Ru groups, identical to or different from each other, are each independently selected from $C_{2-24}$ linear or branched alkylene, preferably $C_{2-12}$ linear or branched alkylene, more preferably $C_{2-6}$ linear or branched alkylene, further more preferably -$CH_2$—$CH_2$— and —$CH_2$—$CH(CH_3)$—, and still more preferably —$CH_2$—$CH(CH_3)$—. According to this embodiment of the present invention, in formula (III), y is selected from any value between 1 and 200, preferably any value between 1 and 100, more preferably any value between 1 and 50, more preferably any value between 1 and 30. Herein, y represents the average polymerization degree of the polyether segment —O—Ru—, and therefore can be a non-integer. As said y value, for example, 1, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7 can be exemplified.

According to this embodiment of the present invention, in formula (III), in case that the group Ru includes two or more different types, different units —O—Ru— can be bonded together in a manner of random arrangement, (two- or multi-) block arrangement, alternative arrangementor the like in any ratio as determined according to the requirement, in a provision that the total (average) number of these units is y. For example, in case that the group Ru represents a combination of —$CH_2$—$CH_2$— and —$CH_2$—$CH(CH_3)$—, and y is 2.2, the unit —O—$CH_2$—$CH_2$— and the unit

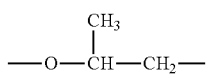

can be bonded together in a manner of random arrangement, (two or more) block arrangement, alternative arrangement or the like in any ratio as determined according to the requirement (e.g. the molar ratio of two units can be 1:99 to 99:1), in a provision that the total (average) number of these two units is 2.2.

According to a particular embodiment of the present invention, in formula (III), at least a part of (at least a certain amount of) groups Ru are selected from $C_{3-6}$ linear or branched alkylene (corresponding to a unit rather than —O—CH$_2$—CH$_2$—), preferably —CH$_2$—CH(CH$_3$)— (corresponding to a unit of

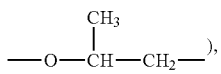

so that the polyether represented by formula (III) must contain (a certain amount, wherein the upper limit thereof is y) of a unit rather than —O—CH$_2$—CH$_2$— (e.g., a unit of

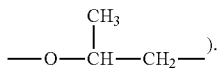

According to a particular embodiment of the present invention, in formula (III), the group $-(O-Ru)_y-$ can be a two-block polyether segment represented by the following formula (III-1). Here, as shown by formula (III-1), the unit —O—CH$_2$—CH$_2$ and the unit

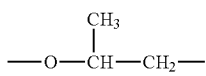

are bonded in a manner of two-block arrangement. Of course, according to the present invention, the group $-(O-Ru)_y-$ is not limited to the specific two-block polyether segment represented by formula (III-1), and it can be a multi-block (such as three- or four-block) polyether segment formed by bonding a unit of —O—CH$_2$—CH$_2$— and a unit of

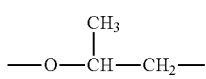

in a manner of a multi-block (e.g., three-three-block or four-block) arrangement. The structure of this multi-block polyether segment is well known to those skilled in the art and will not be addressed herein in details.

(III-1)

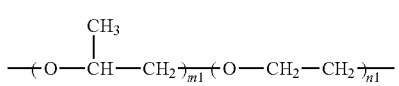

According to this embodiment of the present invention, in formula (III-1), the value m1 is any value between 0 and 200, preferably any value between 0 and 100, more preferably any value between 0 and 50, more preferably any value between 0 and 30.

Here, the value m1 represents an average number of the unit

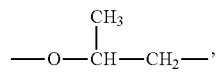

and therefore it can be a non-integer. As said value m1, for example, 0, 0.2, 0.8, 1, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7 can be exemplified.

According to this embodiment of the present invention, in formula (III-1), the value n1 is any value between 0 and 200, preferably any value between 0 and 100, more preferably any value between 0 and 50, more preferably any value between 0 and 30. Here, the value n1 represents the average number of the unit —O—CH$_2$—CH$_2$—, and therefore it can be a non-integer. As said value n1, for example, 0, 0.2, 0.8, 1, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7 can be exemplified.

According to this embodiment of the present invention, in formula (III-1), the value m1 and the value n1 are not zero at the same time, and the sum thereof (i.e. the total average number of the unit

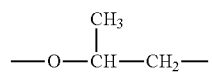

and the unit —O—CH$_2$—CH$_2$—) is y.

Here, y is any value between 1 and 200, preferably any value between 1 and 100, more preferably any value between 1 and 50, more preferably any value between 1 and 30.

According to a preferred embodiment of the present invention, said amino polymer has a structure represented by the following formula (II-A) or a structure represented by the following formula (II-B). Here, said amino polymer is generally called as polyetheramine.

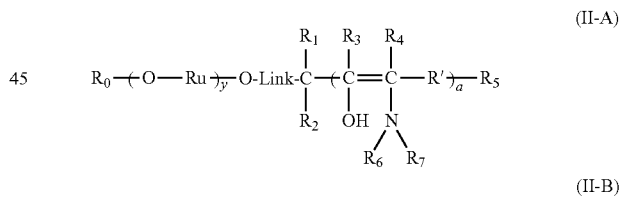

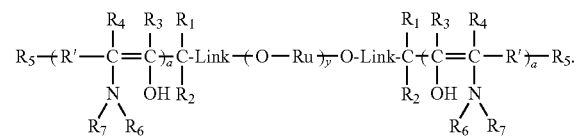

According to this embodiment of the present invention, in formula (II-A) and formula (II-B), each of the groups and the numberic values are respectively defined as described above in the specification of the present application.

According to this embodiment of the present invention, in particular for fuel oil detergent applications, the molecular weight Mn of the polyetheramine is generally 500-10000, preferably 500-4000.

According to an embodiment of the present invention, as said amino polymer, as the amino polymer, a polyetheramine represented by the following formula (I-C) is preferable. The molecular weight Mn of the polyetheramine is generally 600-2000, preferably 1000-1500.

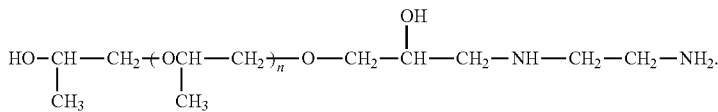

According to an embodiment of the present invention, any of the aforementioned amino polymers can be produced by the following production method. Therefore, the present application also relates to a process for preparing an amino polymer. Specifically, said producing process for example can comprise steps 1) to 3) as follows.

According to the present invention, in step 1), an alkenyl polymer represented by the following formula (A-I) is produced.

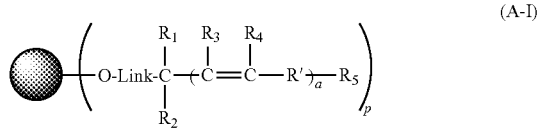

Of course, if the alkenyl polymer represented by the formula (A-I) is commercially available, the step 1) is an optional step rather than a necessary step.

According to the present invention, in formula (A-I), the group

and p —O— groups together represent the main chain of said alkenyl polymer. Therefore, the group

and —O— groups are part of the main chain of said alkenyl polymer.

According to the present invention, in formula (A-I), p is an integer between 1 and 10, preferably an integer between 1 and 3, more preferably 1.

According to the present invention, in formula (A-I), it should be emphasized that, p pendant groups

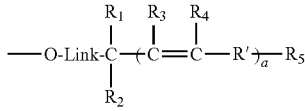

are independent of each other, and each group and each numberic value in these pendant groups may be defined independently each other in these pendant groups and are independently defined as described below.

According to the present invention, in formula (A-I), the group Link represents a linking group, selected from a single bond and $C_{1-10}$ hydrocarbylene. Herein, as $C_{1-10}$ hydrocarbylene, for example, $C_{1-10}$ linear or branched alkylene, $C_{2-10}$ linear or branched alkenylene and $C_{2-10}$ linear or branched alkynylene, preferably $C_{1-6}$ linear or branched alkylene, further preferably $C_{1-4}$ linear or branched alkylene can be exemplified.

According to the present invention, in formula (A-I), the groups $R_1$ and $R_2$, identical to or different from each other, are each independently selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in formula (A-I), there are a groups $R_3$ and a groups $R_4$. Herein, said a groups $R_3$ or said a groups $R_4$, identical to or different from each other, are each independently selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in formula (A-I), a is an integer between 1 and 10, preferably an integer between 1 and 4, more preferably 1, 2 or 3.

According to the present invention, in formula (A-I), there are a groups R'. Herein, said a groups R', identical to or different from each other, are each independently selected from a single bond and $C_{1-10}$ hydrocarbylene. Herein, as $C_{1-10}$ hydrocarbylene, for example, $C_{1-10}$ linear or branched alkylene, $C_{2-10}$ linear or branched alkenylene and $C_{2-10}$ linear or branched alkynylene, preferably $C_{1-6}$ linear or branched alkylene, further preferably $C_{1-4}$ linear or branched alkylene, more preferably methylene or ethylene can be exemplified.

According to the present invention, in formula (A-I), the group $R_5$ is selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, the main chain of said alkenyl polymer (also called skeleton structure) has a structure obtained by removing from a hydroxyl polymer having p' hydroxyl groups the hydrogen atoms of p hydroxyl groups (p free —O— groups remain). Herein, p' is an integer between 1 and 10, preferably an integer between 1 and 3, more preferably 1. p is an integer between 1 and 10, preferably an integer between 1 and 3, more preferably 1, and $1 \le p \le p'$. Correspondingly, the group

has a structure obtained by removing from a hydroxyl polymer having p' hydroxyl groups p hydroxyl groups (p free bonds remain).

According to the present invention, as the parent polymer of said alkenyl polymer, said hydroxyl polymer can be those exemplified above for the parent polymer of said amino polymer, preferably alkylene diol polymer, more preferably the polyether represented by said formula (III).

$$R_0 (\!-\!O\!-\!Ru\!-\!)_y OH \quad \text{(III)}$$

According to a preferred embodiment of the present invention, said alkenyl polymer has a structure represented by the following formula (A-A) or a structure represented by the following formula (A-B).

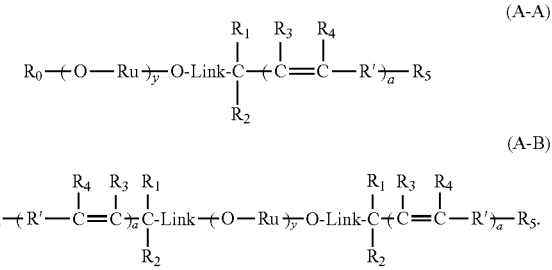

According to this embodiment of the present invention, in formula (A-A) and formula (A-B), each of the groups and the numerical values is defined as described above in the specification of the present application.

According to the present invention, in step 1), as the process for producing the alkenyl polymer represented by said formula (A-I), for example, the following manner A) or B) can be exemplified.

According to the present invention, according to the manner A), the reaction of the hydroxyl polymer represented by the following formula (A-I) and the alkenyl compound represented by the following formula (A-III) produces the alkenyl polymer represented by the formula (A-I).

According to an embodiment of the present invention, according to the manner A), during or after the production of the hydroxyl polymer represented by the formula (A-II), the alkenyl compound represented by said formula (A-III) can be introduced to the polymerization reaction system of said hydroxyl polymer to carry out the reaction.

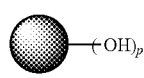
(A-II)

According to the present invention, in formula (A-II), the group

and the numberic value p are respectively defined as described in the specification of the present application.

According to the present invention, according to the manner A), as said hydroxyl polymer, for example, those exemplified above for the parent polymer of said amino polymer, preferably alkylene diol polymer, more preferably the polyether represented by the formula (III) can be exemplified.

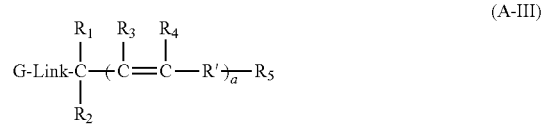

According to the present invention, in formula (A-III), the group G represents a functional group capable of reacting with —OH (e.g., at least one —OH group on the hydroxyl polymer represented by the formula (A-II), preferably all of p —OH groups) to remove the compound GH, preferably halogen or hydroxyl. Herein, chlorine is more preferable as said halogen.

According to the present invention, in formula (A-III), the group Link represents a linking group, selected from a single bond and $C_{1-10}$ hydrocarbylene. Herein, as $C_{1-10}$ hydrocarbylene, for example, $C_{1-10}$ linear or branched alkylene, $C_{2-10}$ linear or branched alkenylene and $C_{2-10}$ linear or branched alkynylene, preferably $C_{1-6}$ linear or branched alkylene, further preferably $C_{1-4}$ linear or branched alkylene can be exemplified.

According to the present invention, in formula (A-III), the groups $R_1$ and $R_2$, identical to or different from each other, are each independently selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in formula (A-III), there are a groups $R_3$ and a groups $R_4$. Herein, said a groups $R_3$ or said a groups $R_4$, identical to or different from each other, are each independently selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in formula (A-III), a is an integer between 1 and 10, preferably an integer between 1 and 4, more preferably 1, 2 or 3.

According to the present invention, in formula (A-III), there are a groups R'. Herein, said a groups R', identical to or different from each other, are each independently selected from a single bond and $C_{1-10}$ hydrocarbylene. Herein, as $C_{1-10}$ hydrocarbylene, for example, $C_{1-10}$ linear or branched alkylene, $C_{2-10}$ linear or branched alkenylene and $C_{2-10}$ linear or branched alkynylene, preferably $C_{1-6}$ linear or branched alkylene, further preferably $C_{1-4}$ linear or branched alkylene, more preferably methylene or ethylene can be exemplified.

According to the present invention, in formula (A-III), the group $R_5$ is selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in the manner A), more specifically, allyl alcohol, 3-buten-1-ol, 3-buten-2-ol, 3-methyl-3-buten-1-ol, 4-penten-1-ol, 4-penten-2-ol, 4-penten-3-ol, 3-methyl-4-penten-1-ol, 2-methyl-4-penten-1-ol, 3-ethyl-4-penten-1-ol, 2-ethyl-4-penten-1-ol, 3-isobutyl-4-penten-1-ol, 2-isobutyl-4-penten-1-ol, 2,3-dimethyl-4-penten-1-ol, 2,2-dimethyl-4-penten-1-ol, 3,3-dimethyl-4-penten-1-ol, 5-hexen-1-ol, 4-methyl-5-hexenol, 3-methyl-5-hexenol, 2-methyl-5-hexenol, 3-ethyl-5-hexenol, 5-hexen-2-ol, 5-hexen-3-ol, 5-hexen-4-ol, 6-hepten-1-ol, 2-methyl-6-hepten-1-ol, 3-methyl-6-hepten-1-ol, 4-methyl-6-hepten-1-ol, 5-methyl-6-hepten-1-ol, 2-ethyl-6-hepten-1-ol, 3-ethyl-6-hepten-1-ol, 4-ethyl-6-hepten-1-ol, 5-ethyl-6-hepten-1-ol, 2-methyl-7-octen-1-ol, 3-methyl-7-octen-1-ol, 4-methyl-7-octen-1-ol, 5-methyl-7-octen-1-ol, 6-methyl-7-octen-1-ol, 3-ethyl-7-octen-1-ol, 9-decen-1-ol, 10-undecen-1-ol, 11-dodecen-1-ol, allyl halide, 3-buten-1-halogen, 3-buten-2-halogen, 3-methyl-3-buten-1-halogen, 4-penten-1-halogen, 4-penten-2-halogen, 4-penten-3-halogen, 3-methyl-4-penten-1-halogen, 2-methyl-4-penten-1-halogen, 3-ethyl-4-penten-1-halogen, 2-ethyl-4-penten-1-halogen, 3-isobutyl-4-penten-1-halogen, 2-isobutyl-4-penten-1-halogen, 2,3-dimethyl-4-penten-1-halogen, 2,2-dimethyl-4-penten-1-halogen, 3,3-dimethyl-4-penten-1-halogen, 5-hexen-1-halogen, 4-methyl-5-hexene halogen, 3-methyl-5-hexene halogen, 2-methyl-5-hexene halogen, 3-ethyl-5-hexene halogen, 5-hexen-2-halogen, 5-hexen-3-halogen, 5-hexen-4-halogen, 6-hepten-1-halogen, 2-methyl-6-hepten-1-halogen, 3-methyl-6-hepten-1-halogen, 4-methyl-6-hepten-1-halogen, 5-methyl-6-hepten-1-halogen, 2-ethyl-6-hepten-1-halogen, 3-ethyl-6-hepten-1-halogen, 4-ethyl-6-hepten-1-halogen, 5-ethyl-6-hepten-1-halogen, 2-methyl-7-octen-1-halogen, 3-methyl-7-octen-1-halogen, 4-methyl-7-octen-1-halogen, 5-methyl-7-octen-1-halogen, 6-methyl-7-octen-1-halogen, 3-ethyl-7-octen-1-halogen, 9-decen-1-halogen, 10-undecen-1-halogen, 11-dodecen-1-halogen, 5-chloro-1,3-pentadiene, 6-chloro-1,3-hexadiene, 5-chloro-1,3-hexadiene, 6-chloro-2,4-hexadiene and 5-chloro-2,4-hexadiene can be exemplified as the alkenyl compound as represented by said formula (A-III). These alkenyl compounds may be used alone or in combination of two or more.

According to the present invention, according to the manner A), the molar ratio of the hydroxyl polymer represented by the formula (A-II) to the alkenyl compound represented by said formula (A-III) is generally 1:1-1.5, preferably 1:1-1.2.

According to the present invention, according to the manner A), the reaction temperature is generally 50-150° C.

According to the present invention, according to the manner A), the reaction pressure is generally the normal pressure.

According to the present invention, according to the manner A), the reaction time is generally 2-10 h.

According to the present invention, according to the manner A), a catalyst can be used as required. As said catalyst, for example, those commonly used by those skilled in the art for this purpose can be exemplified. For example, a basic catalyst can be exemplified. More specifically, a base metal, a base metal alkoxidealkoxide and a base metal hydroxide, in particular potassium hydroxide and sodium methoxide can be exemplified. These catalysts may be used alone or in combination of two or more. In use, the molar ratio of said catalyst to the alkenyl compound represented by said formula (A-III) is generally 1-2:1, preferably 1-1.5:1, most preferably 1-1.1:1.

According to the present invention, according to the manner A), a solvent can be optionally used. In use, as said solvent, for example, $C_{1-6}$ monohydric alcohol can be exemplified. More specifically, methanol, ethanol, isopropanol and n-butanol can be exemplified. These solvents may be used alone or in combination of two or more.

According to the present invention, according to the manner B), upon producing the hydroxyl polymer represented by the formula (A-II), the alkenyl compound represented by said formula (A-III) is used as a starter. Herein, the so-called "used as a starter", refers to using the group G on the alkenyl compound represented by said formula (A-III) as the initiation point of the polymerization reaction, and forming said hydroxyl polymer through the subsequent chain growth reaction, thus producing the hydroxyl polymer having the starter (removing the group G) as a chain end.

According to the present invention, as said manner B), for example, a process comprising the following steps B-1) and B-2) can be exemplified.

According to the present invention, in step B-1), the reaction between the alkenyl compound represented by said formula (A-III) and alkylene oxide produces the alkenyl polyether represented by the following formula (A-V).

According to the present invention, in step B-1), the alkylene oxide is represented by the following formula (A-IV). As said alkylene oxide, more specifically, ethylene oxide, propylene oxide, butylene oxide, pentylene oxide and hexylene oxide, preferably ethylene oxide and propylene oxide can be exemplified. These alkylene oxides may be used alone or in combination of two or more.

(A-IV)

According to the present invention, in the formula (A-IV), the group Ru' is selected from a single bond and $C_{1-22}$ linear or branched alkyl. Herein, as $C_{1-22}$ linear or branched alkyl, for example, $C_{1-20}$ linear or branched alkyl, $C_{1-10}$ linear or branched alkyl or $C_{1-4}$ linear or branched alkyl, preferably methyl can be exemplified.

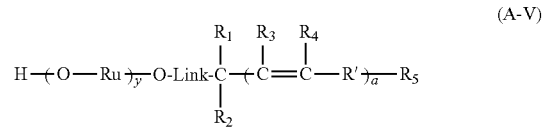

(A-V)

According to the present invention, in formula (A-V), there are y Ru groups. Herein, said y Ru groups, identical to or different from each other, are each independently selected from $C_{2-24}$ linear or branched alkylene, preferably are each independently selected from $C_{2-12}$ linear or branched alkylene, more preferably are each independently selected from $C_{2-6}$ linear or branched alkylene, more preferably are each independently selected from —$CH_2$—$CH_2$— and —$CH_2$—$CH(CH_3)$—, more preferably —$CH_2$—$CH(CH_3)$—.

According to the present invention, in formula (A-V), y is any value between 1 and 200, preferably any value between 1 and 100, more preferably any value between 1 and 50, more preferably any value between 1 and 30. Herein, y represents the average polymerization degree of the polyether segment —O—Ru—, and therefore it can be a non-integer. As said value y, for example, 1, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7 can be exemplified.

According to the present invention, in formula (A-V), in case that the group Ru includes two or more different types, different units —O—Ru— can be bonded together in a manner of random arrangement, (two- or multi-) block arrangement, alternative arrangement or the like in any ratio as determined according to the requirement, in a provision that the total (average) number of these units is y. For example, in case that the group Ru represents a combination of —CH$_2$—CH$_2$— and —CH$_2$—CH(CH$_3$)—, and y is 2.2, the unit —O—CH$_2$—CH$_2$— and the unit

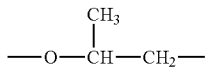

can be bonded together in a manner of random arrangement, (two or more) block arrangement, alternative arrangement or the like in any ratio as determined according to the requirement (e.g. the molar ratio of two units can be 1:99 to 99:1), in a provision that the total (average) number of these two units is 2.2.

According to a particular embodiment of the present invention, in formula (A-V), at least a part of (at least a certain amount of) groups Ru are selected from C$_{3-6}$ linear or branched alkylene (corresponding to a unit rather than —O—CH$_2$—CH$_2$—), preferably —CH$_2$—CH(CH$_3$)— (corresponding to a unit of

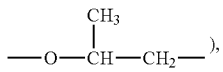

so that the polyether represented by formula (A-V) must contain (a certain amount, wherein the upper limit thereof is y) of a unit rather than —O—CH$_2$—CH$_2$— (e.g., a unit of

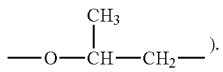

According to a particular embodiment of the present invention, in formula (A-V), the group $-(-O-Ru-)_y$ can be a two-block polyether segment represented by the following formula (A-V-1). Here, as shown by formula (A-V-1), the unit —O—CH$_2$—CH$_2$— and the unit

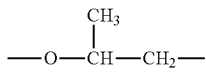

are bonded in a manner of two-block arrangement. Of course, according to the present invention, the group $-(-O-Ru-)_y$ is not limited to the specific two-block polyether segment represented by formula (A-V-1), and it can be a multi-block (such as three- or four-block) polyether segment formed by bonding a unit of —O—CH$_2$CH$_2$— and a unit of

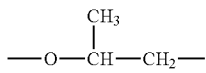

in a manner of a multi-block (e.g., three-three-block or four-block) arrangement. The structure of this multi-block polyether segment is well known to those skilled in the art and will not be addressed herein in details.

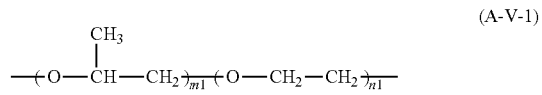

(A-V-1)

According to this embodiment of the present invention, in formula (A-V-1), the value m1 is any value between 0 and 200, preferably any value between 0 and 100, more preferably any value between 0 and 50, more preferably any value between 0 and 30.

Here, said value m1 represents the average number of the unit

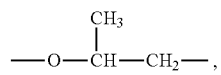

and therefore it can be a non-integer. As said value m1, for example, 0, 0.2, 0.8, 1, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7 can be exemplified.

According to this embodiment of the present invention, in formula (A-V-1), the value n1 is any value between 0 and 200, preferably any value between 0 and 100, more preferably any value between 0 and 50, more preferably any value between 0 and 30.

Here, the value n1 represents the average number of the unit —O—CH$_2$CH$_2$—, and therefore it can be a non-integer. As said value n1, for example, 0, 0.2, 0.8, 1, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7 can be exemplified.

According to this embodiment of the present invention, in formula (A-V-1), the value m1 and the value n1 are not zero at the same time, and the sum thereof (i.e. the total average number of the unit and the unit

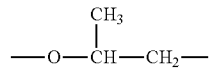

and the unit —O—CH$_2$—CH$_2$—) is y. Herein, y is any value between 1 and 200, preferably any value between 1 and 100, more preferably any value between 1 and 50, more preferably any value between 1 and 30.

According to the present invention, in step B-2), optionally, during or after the step B-1), optionally, during or after said step B-1), at least one blocking agent selected from the compound represented by the following formula (A-VI) and the alkenyl compound represented by said formula (A-III) is introduced to the reaction system, and reacted with the alkenyl polyether represented by the formula (A-V) that has formed in the reaction system, so that at least a part of said alkenyl polyether is converted to the alkenyl polyether represented by the following formula (A-VII) or the alkenyl polyether represented by the following formula (A-VIII). Herein, the compound represented by said formula (A-VI) and the alkenyl compound represented by said formula (A-III) both function as a blocking agent and are collectively referred to as a blocking agent.

G'-R'$_0$ (A-VI)

According to the present invention, in formula (A-VI), the group G' represents a functional group capable of reacting with —OH (e.g., the —OH group on the alkenyl polyether represented by the formula (A-V)) to remove the compound G'H, preferably halogen or hydroxyl. Herein, chlorine is more preferable as said halogen.

According to the present invention, in formula (A-VI), the group R'$_0$ is an optionally substituted C$_{1-50}$ hydrocarbyl. Herein, as C$_{1-50}$ hydrocarbyl, for example, C$_{1-50}$ linear or branched alkyl, C$_{2-50}$ linear or branched alkenyl, C$_{2-50}$ linear or branched alkynyl, C$_{6-50}$monocyclic or polycyclic aryl and C$_{3-50}$ monocyclic or polycyclic cycloalkyl can be exemplified, more specifically, C$_{1-20}$ linear or branched alkyl, C$_{6-10}$monocyclic or polycyclic aryl and C$_{3-20}$ monocyclic or polycyclic cycloalkyl (or C$_{5-7}$ monocyclic or polycyclic cycloalkyl), particularly C$_{5-15}$ linear or branched alkyl, phenyl and cyclohexyl can be exemplified.

According to a preferred embodiment of the present invention, in formula (A-VI), in the definition of the group R'$_0$, the so-called "optionally substituted" preferably refers to being substituted by one or more (e.g., 1-5, 1-4, 1-3, 1-2 or 1) C$_{1-20}$ linear or branched alkyl, preferably one or more (e.g., 1-5, 1-4, 1-3, 1-2 or 1) C$_{5-15}$ linear or branched alkyl. Herein, as said the group R'$_0$, for example, dodecylphenyl or nonylphenyl can be exemplified.

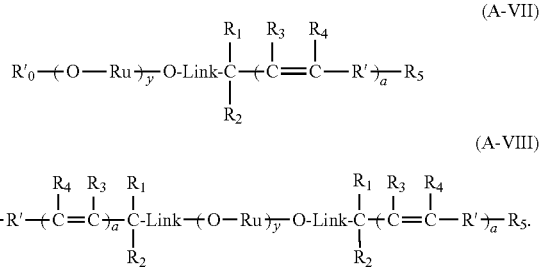

According to the present invention, in formula (A-VII) and formula (A-VIII), each of the groups and the numerical values is defined as described above in the specification of the present application.

According to the present invention, in step B-1), the molar ratio of the alkenyl compound represented by said formula (A-II) to the alkylene oxide is generally 1:1-100, preferably 1:10-40. In step B-2), the molar ratio of the alkenyl polyether represented by the formula (A-V) to said blocking agent is generally 1:1-1.5, preferably 1:1-1.2.

According to the present invention, in step B-1) and step B-2), the reaction temperature is generally 100-200° C., preferably 100-150° C., most preferably 100-120° C.

According to the present invention, in step B-1) and step B-2), the reaction pressure is generally 1-5 kg, preferably 1-3 kg, most preferably 1-2 kg.

According to the present invention, in step B-1), the reaction time is generally 3-20 h, preferably 3-11 h. In step B-2), the reaction time is generally 2-10 h, preferably 6-8 h.

According to the present invention, in step B-1), a catalyst can be used as required. As said catalyst, for example, those commonly used by those skilled in the art for this purpose can be exemplified. For example, a basic catalyst can be exemplified. More specifically, a base metal, a base metalalkoxide and a base metal hydroxide, particularly potassium hydroxide and sodium methoxide can be exemplified. These catalysts may be used alone or in combination of two or more. In use, the molar ratio of said catalyst to the alkenyl compound represented by said formula (A-III) is generally 1-2:1, preferably 1-1.5:1, most preferably 1-1.1:1. According to the present invention, in step B-1), a solvent can be optionally used. In use, as said solvent, for example, C$_{1-6}$ monohydric alcohol can be exemplified. More specifically, methanol, ethanol, isopropanol and n-butanol can be exemplified. These solvents may be used alone or in combination of two or more.

According to the present invention, in step (2), the alkenyl polymer represented by the formula (A-I) and an oxidant is subjected to oxidation reaction, in which at least one (preferably more than one) group

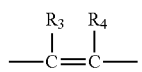

contained in said alkenyl polymer is oxidized to the group

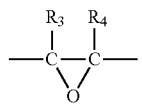

to produce the oxidation product.

According to a preferred embodiment of the present invention, in step (2), the all p×a groups

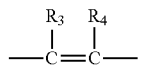

are oxidized into the group

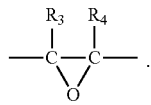

According to the present invention, in step (2), said oxidation reaction can be carried out in any manner conventionally known to those skilled in the art, as long as the at least one (preferably all p×a) groups

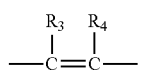

can be oxidized into the group

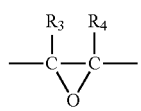

According to the present invention, in step (2), as said oxidant, for example, those commonly used by those skilled in the art for achieving the olefin epoxidation can be exemplified. For example, oxygen, ozone, hydrogen peroxide, metal oxide, metal peroxide, dichromic acid or its salt, permanganic acid or its salt, peracid or its salt, hypohalous acid or its salt, organic hydroperoxide and organic peroxide can be exemplified. More specifically, hydrogen peroxide, organic hydroperoxide and organic peroxo acid, particularly hydrogen peroxide aqueous solution, sodium hypochlorite, ammonium peroxodisulfate, benzoyl peroxide, N-methyl morpholine oxide, methyl ruthenium oxide, osmium tetroxide, hypochlorous acid, $KnO_4$, $K_2Cr_2O_7$, $KNO_3$, $Na_2O_2$, $MnO_2$, ozone and oxygen can be exemplified. Herein, as said organic hydroperoxide, more specifically, tert-butyl hydroperoxide can be exemplified. As said organic peroxo acid, more specifically, $C_{3-12}$ organic peroxo acid, preferably performic acid, peracetic acid, peroxypropionic acid, peroxybutyric acid, peroxybenzoic acid or meta-chloroperoxybenzoic acid can be exemplified. As said oxidant, meta-chloroperoxybenzoic acid and peracetic acid is particularly preferable, meta-chloroperoxybenzoic acid is most preferable. These oxidants may be used alone or in combination of two or more.

According to the present invention, in step (2), the molar ratio of said oxidant to the alkenyl polymer represented by the formula (A-I) (as

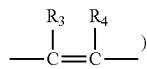

)

is generally 10-1:1, preferably 5-1:1, most preferably 3-1:1.

According to the present invention, in step (2), the reaction temperature of said oxidation reaction is generally 20-80° C., preferably 20-60° C., most preferably 30-50° C.

According to the present invention, in step (2), the reaction pressure of said oxidation reaction is generally 1-5 kg, preferably 1-3 kg, most preferably 1-2 kg.

According to the present invention, in step (2), the reaction time of said oxidation reaction is generally 1 h-8 h, preferably 2 h-6 h, most preferably 2 h-4 h.

According to the present invention, in step (2), a catalyst can be optionally used. As said catalyst, for example, those commonly used by those skilled in the art for achieving the olefin epoxidation can be exemplified. For example, hydrotalcite-type catalyst, molecular sieve-type catalyst, organic acid and inorganic acid can be exemplified. As said hydrotalcite-type catalyst, for example, intercalated hydrotalcite and hydrotalcite-like compound can be exemplified. As the molecular sieve-type catalyst, for example, Ti—Si molecular sieve can be exemplified. As said organic acid, for example, $C_{1-5}$ carboxylic acids, such as formic acid, acetic acid, propionic acid, butyric acid and valeric acid can be exemplified. As said inorganic acid, for example, sulfuric acid, hydrochloric acid, nitric acid, and phosphoric acid can be exemplified. These catalysts may be used alone or in combination of two or more. In use, the molar ratio of said catalyst to the alkenyl polymer represented by the formula (A-I) (as

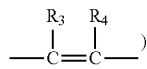

)

is generally 0.1-5:1, preferably 0.5-5.0:1, most preferably 0.5-3.0:1.

According to the present invention, in step (2), a solvent can be optionally added. As said solvent, for example, C1-C8alcohol can be exemplified. More specifically, n-propanol, n-butanol and n-hexanol can be exemplified.

According to the present invention, in step 3), the oxidation product obtained in step 2) and an aminating agent are subjected to an amination reaction, all of the group

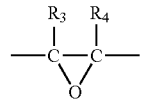

is aminated to the group

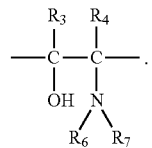

.

According to the present invention, in step 3), as said aminating agent, for example, an aminating agent represented by the following formula (B-I) can be exemplified; for example, ammonia, $C_1$-$C_{30}$ primary amines, $C_3$-$C_{30}$ secondary amines, alcohol amines and polyene polyamine, preferably ammonia and $C_1$-$C_{30}$ primary amines, more specifically, ammonia, ethylamine, propylamine, ethylene diamine, ethanolamine and triethylene tetraamine can be exemplified. These aminating agents may be used alone or in combination of two or more.

(B-I)

According to the present invention, in formula (B-I), the groups $R_6$ and $R_7$, identical to or different from each other, are each independently selected from hydrogen, optionally substituted $C_{1-10}$ hydrocarbyl and

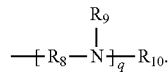

Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to a preferred embodiment of the present invention, in formula (B-I), in the definition of the group $R_6$ or the group $R_7$, the so-called "optionally substituted" preferably refers to being substituted by one or more (e.g., 1-5, 1-4, 1-3, 1-2 or 1) hydroxyl groups.

According to the present invention, in the formula

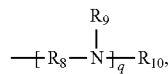

there are q groups $R_8$. Herein, said q groups $R_8$, identical to or different from each other, are each independently selected from $C_{1-40}$ hydrocarbylene. As $C_{1-40}$ hydrocarbylene, for example, $C_{1-40}$ linear or branched alkylene, $C_{2-40}$ linear or branched alkenylene and $C_{2-40}$ linear or branched alkynylene, preferably $C_{1-40}$ linear or branched alkylene, more preferably $C_{1-20}$ linear or branched alkylene, further preferably $C_{2-6}$ linear or branched alkylene can be exemplified.

According to the present invention, in the formula

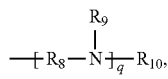

there are q groups $R_9$. Herein, said q groups $R_9$, identical to or different from each other, are each independently selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in the formula

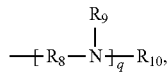

the group $R_{10}$ is selected from hydrogen and $C_{1-10}$ hydrocarbyl. Herein, as $C_{1-10}$ hydrocarbyl, for example, $C_{1-10}$ linear or branched alkyl, $C_{2-10}$ linear or branched alkenyl and $C_{2-10}$ linear or branched alkynyl, preferably $C_{1-6}$ linear or branched alkyl, further preferably $C_{1-4}$ linear or branched alkyl can be exemplified.

According to the present invention, in the formula

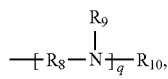

q is an integer between 1 and 50, preferably an integer between 1 and 10, more preferably 1, 2, 3 or 4.

According to the present invention, in step 3), the molar ratio of said aminating agent to said oxidation product (as

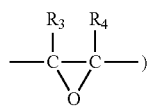

is generally 1-4:1, preferably 1-2:1, most preferably 1-1.5:1.

According to the present invention, in step 3), the reaction temperature is generally 100-180° C., preferably 100-150° C., most preferably 120-150° C.

According to the present invention, in step 3), the reaction pressure is generally 1-5 kg, preferably 1-3 kg, most preferably 1-2 kg.

According to the present invention, in step 3), the reaction time is generally 1 h-8 h, preferably 2 h-6 h, most preferably 2 h-5 h.

According to the present invention, in step 3), a solvent can be optionally added. As said solvent, for example, C1-C8alcohol, more specifically, n-propanol, n-butanol and n-hexanol can be exemplified.

According to the present invention, in step 3), a catalyst can be optionally added. As said catalyst, for example, tertiary amine and phenolic substance, preferably tertiary amine can be exemplified. As said tertiary amine, for example, trihydrocarbyl tertiary amine and amino derivative thereof having a molecular weight of 10-500 can be exemplified; more specifically, trimethylamine, triethylamine, tripropylamine, N,N-dimethylethylamine, N,N-dimethylpropylamine, N,N-dimethylbutylamine, N,N-diethylpropylamine, N,N-dipropyl-1-propylamine, N,N-diethylbutylamine, N,N-dimethyl-1,2-ethylene diamine, N,N-dimethyl-1,3-propylene diamine, N,N-dimethylpentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-diethylpentylamine, N,N-diethylhexylamine, N,N-diethylheptylamine, N,N-diethyloctylamine, N,N-diethylnonylamine, N,N-diethyldecylamine, N,N-diethylundecylamine, N,N-diethyldodecylamine, N,N-dipropylbutylamine, N,N-dipropylpentylamine, N,N-dipropylhexylamine, N,N-dipropylheptylamine, N,N-dipropyloctylamine, N,N-dipropylnonylamine, N,N-dipropyldecylamine, N,N-dipropylundecylamine, N,N-dipropyldodecylamine, triphenylamine and N,N-2methylbenzylamine, preferably trimethylamine, triethylamine and N,N'-2methylbenzylamine, most preferably trimethylamine and/or triethylamine can be exemplified. These tertiary amines may be used alone or in combination of two or more. As said phenolic material, for example, monohydric phenol, dihydric phenol, polyhydric phenoldihydric phenol or phenolic sodium having a molecular weight of 20-500, to the benzene ring of which an electron-donating group such as alkoxy, phenyl, and alkyl can be attached, can be exemplified. As said phenolic material, more specifically, phenol, sodium phenoxide, hydroquinone, sodium benzene-1,4-bis(olate), o-cresol, sodium o-cresolate, m-cresol, sodium m-cresolate, p-cresol and sodium p-cresolate, 2,4-dimethylphenol, 2,4,6-trimethylphenol, ethyl phenol, sodium ethylphenoxide, 2,4-diethylphenol, 2,4,6-triethylphenol, p-methoxyphenol, m-methoxyphenol, o-methoxyphenol, sodium p-methoxy phenoxide, sodium m-methoxy phenoxide, sodium o-methoxy phenoxide, phenylphenol and phenylsodium phenoxide, preferably phenol and/or sodium phenoxide, most preferably sodium phenoxide can be exemplified. These phenolic substances may be used alone or in combination of two or more.

According to the present invention, in step 3), in use, the molar ratio of said catalyst to said oxidation product (as

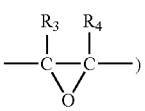

is 0.1-1:1, preferably 0.1-0.5:1, most preferably 0.3-0.5:1.

According to the present invention, after the completion of the process for producing said amino polymer, the catalyst and any possible solvent are removed in any known conventional manner from the finally obtained reaction mixture to produce the amino polymer. Therefore, the present invention also relates to the amino polymer produced by the aforementioned process for producing the amino polymer of the present invention.

The amino polymer of the present invention is particularly suitable for producing a detergent (a detergent base), for example, fuel oil detergent, particularly gasoline detergent. The detergent shows an excellent deposit generation inhibition performance. Herein, the detergent comprises any aforementioned amino polymer of the present invention or the amino polymer produced by the aforementioned producing process of the present invention.

According to the present invention, in order to produce said detergent, a diluent can be added to the amino polymer. Herein, as said diluent, for example, mineral base oil, polyolefin and polyether can be exemplified. These diluents may be used alone or in combination of two or more.

According to the present invention, for example, one or more API Type I, Type II, Type III mineral lubricating base oils, preferably one or more mineral lubricating base oils having a viscosity of 20-120 centistokes (cSt) at 40° C. and a viscosity index of at least 50 or more, more preferably one or more mineral lubricating base oils having a viscosity of 28-110 centistokes (cSt) at 40° C. and a viscosity index of at least 80 or more, can be used as the mineral base oil.

According to the present invention, as said polyolefin, for example, one or more polyolefins obtained through the homopolymerization of ethylene, propylene or $C_4$-$C_{10}$ α-olefin or the copolymerization of two or more of these olefins, preferably one or more poly-α-olefins (PAOs) having a viscosity of 2-25 centistokes (cSt) at 100° C. (preferably 6-10 centistokes (cSt) at 100° C.) can be exemplified. Herein, as $C_4$-$C_{10}$ α-olefin, for example, n-butene, isobutene, n-pentene, n-hexene, n-octene and n-decene can be exemplified. Additionally, the number-average molecular weight Mn of said polyolefin is generally 500-3000, preferably 500-2500, most preferably 500-1500.

According to the present invention, as said polyether, for example, a polymer formed from the reaction between an alcohol and an epoxide can be exemplified. As said alcohol, for example, ethylene glycol and/or 1,3-propylene glycol can be exemplified. As said epoxide, for example, ethylene oxide and/or propylene oxide can be exemplified. Additionally, the number-average molecular weight Mn of said polyether is generally 500-3000, preferably 700-3000, most preferably 1000-2500.

Generally, in the detergent of the present invention, said amino polymer comprises 10-70 wt %, preferably 30-70 wt %, most preferably 50-70 wt % by the total weight of the detergent.

According to the present invention, in order to produce the detergent, the amino polymer and the diluent (if used) are mixed at 20° C. to 60° C. for 1 h to 6 h.

The amino polymer or the detergent of the present invention is also particularly suitable for producing a fuel oil composition, which fuel oil composition shows an excellent deposit generation inhibition performance. Therefore, the present invention further relates to a fuel oil composition, comprising any aforementioned amino polymer of the present invention, the amino polymer produced by the aforementioned producing process of the present invention or the aforementioned detergent of the present invention, and a base fuel.

According to the present invention, calculated as the amino polymer, based on the total weight of the fuel oil composition, said amino polymer or said detergent is generally added in an amount of 30-2000 mg/kg, preferably 50-2000 mg/kg, more preferably 50-1000 mg/kg.

According to the present invention, as said base fuel, for example, a base fuel used in spark ignition type or compression ignition type internal combustion engines, e.g. a fuel oil such as lead-containing or lead-free motor gasoline, aviation gasoline, and diesel, can be exemplified.

According to the present invention, besides said amino polymer and said detergent, the fuel oil composition can also contain other additional additives. As said additional additive, for example, detergents, antioxidants, diluents, metal deactivators, dyes, markers, corrosion inhibitors, insecticides, antistatic agents, damp-reducing agents, demulsifiers, defoamers, anti-icing additives, anti-knocking agent, lubricant additives, and combustion enhancers can be exemplified. These additional additives may be used alone or in combination of two or more, and the used amounts thereof are those conventionally used in the art without any particular limitation.

EXAMPLES

In the following Examples and Comparative Examples, the present invention is further described in detail by taking a polyetheramine as an example of an amino polymer, but the present invention is not limited thereto. It will be apparent to those skilled in the art that other types of amino polymers can be produced based on the foregoing disclosure of the present disclosure and used as a fuel oil detergent.

The deposit generation inhibition performances in Examples and Comparative Examples were evaluated as follows.

Gasoline engine intake valve deposit simulation test method (GB19592-2004) was used. Specifically, xylene and n-heptane were used for cleaning the pipeline, the oil circuit, and the sample bottle respectively; the sponge in the sample inlet in the sample bottle was replaced, the sample was added, the deposition plate was inserted into the slot and clamped, and the thermocouple was inserted. The timing period was set to 70 min. When the temperature rose to 165° C., the air stop valve was opened, the air flow was controlled at 700 L/h, and the air pressure was controlled at 80 kPa. Upon reaching 175° C., the fuel valve was opened, the air bubbles was discharged until no sound occurred; the indication float was stabilized at a level of "30", and the spraying of sample was controlled and finished within 70-75 min. The fuel valve and air valve were closed. The atmosphere was maintained at 175° C., and the timing was reset to 10 min. The heating was turned off, and the deposition plate was cooled naturally and then soaked in n-heptane for 6 mins. The deposition plate was taken out, balanced and weighed, and the difference between the blank and the deposition plate was the amount of the produced deposit.

The deposit reduction rate was an important indicator for evaluating the detergency of detergents. The greater the deposit reduction rate, the stronger the detergency. Based on the Gasoline engine intake valve deposit simulation test method (GB19592-2004), the amount of the produced deposit ($m_{IVD}$, mg) was measured, and the deposit reduction rate was calculated according to the following equation:

$$\text{Deposit Reduction Rate} = \frac{m_{IVD,0} - m_{IVD}}{m_{IVD,0}} \times 100$$

wherein, $m_{IVD,0}$ and $m_{IVD}$ are the production amounts of the deposits in the simulated intake valves with the blank gasoline and the detergent-added gasoline, in unit of mg.

Example 1

1) Polyether Preparation.

A mixture of 58 g of allyl alcohol and 1.5 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 696 g of propylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, an alkenyl polyether product was obtained, and the bromine value of the product was 19.40 gBr/100 g. The obtained polyether had a chemical formula of:

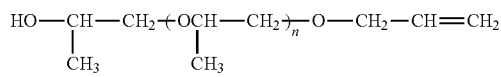

The average polymerization degree n of the obtained alkenyl polyether was 11.

2) Epoxidation of Alkenyl Polyether.

Under nitrogen protection, to a four-neck flask 754 g of the alkenyl polyether and 60 g of formic acid were added. The mixture was warmed up to 60° C., and 453 g of hydrogen peroxide (well mixed) was added dropwisely in two hours to the four-necked flask. The mixture was reacted for 2-8 hours. The product was washed with an aqueous NaOH solution to a pH of about 7 and then water-washed for three times to produce, after drying and rotary evaporation, an epoxy polyether. The obtained epoxy polyether had a chemical formula of:

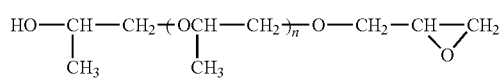

The average polymerization degree n of the obtained epoxy polyether was 11.

3) The abovetreated material was introduced to an amination reaction vessel, and 60 g of ethylene diamine and 10 g of n-butanol were added. The reaction was carried out at 150° C. for 2-6 hours to produce a crude polyetheramine product. The crude product was water-washed and dried in rotary evaporation to produce a final polyetheramine product with a nitrogen content of 2.45% and a total conversion of 70%. The resulting polyetheramine had a chemical formula of:

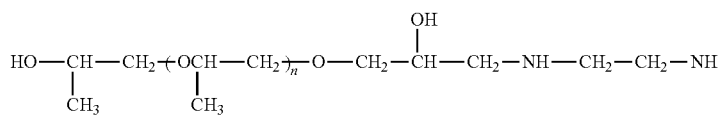

The average polymerization degree n of the resulting polyetheramine was 11.

FIG. 1 is a comparison graph of the infrared spectrum of alkenyl polyether, epoxy polyether, and polyetheramine in Example 1. In the figure, curves A, B, and C in order from top to bottom respectively represent the infrared spectrum of alkenyl polyether, epoxy polyether, and polyetheramine. In the figure, the curves A, B and C have the characteristic peak at 3471 cm$^{-1}$ for the terminal hydroxyl group, the strong and broad symmetric stretching vibration absorption peak at 1108 cm$^{-1}$ for the ether bond C—O—C, and the absorption peaks at 2900 cm$^{-1}$, 1300 cm$^{-1}$ and 1460 cm$^{-1}$ for characterizing the C—H stretching vibration and the deformation vibration of the $CH_2$ and $CH_3$ groups. The main differences appears between 1500 and 1700 cm$^{-1}$, for the curve A, the stretching vibration peak of the starting material alkenyl polyether carbon-carbon double bond, σC=C absorption peak, is located at 1670-1620 cm$^{-1}$ and its intensity is relatively weak; for the curve B, due to the epoxidation of the double bond of epoxy polyether, the absorption peak at this location disappears; for the curve C, the primary amine of the product polyetheramine has an in-plane bending vibration, the δN—H is located at 1650-1500 cm$^{-1}$, the primary amine has a moderate δN—H adsorption intensity, and the secondary amine has a weak adsorption intensity.

Figure 2:
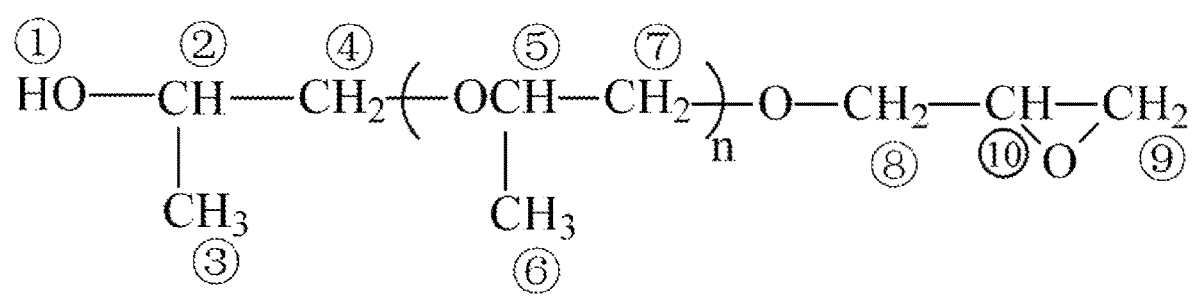
FIG. 2 is a $^1$H NMR spectrum of the epoxy polyether of Example 1.
Figure 2:
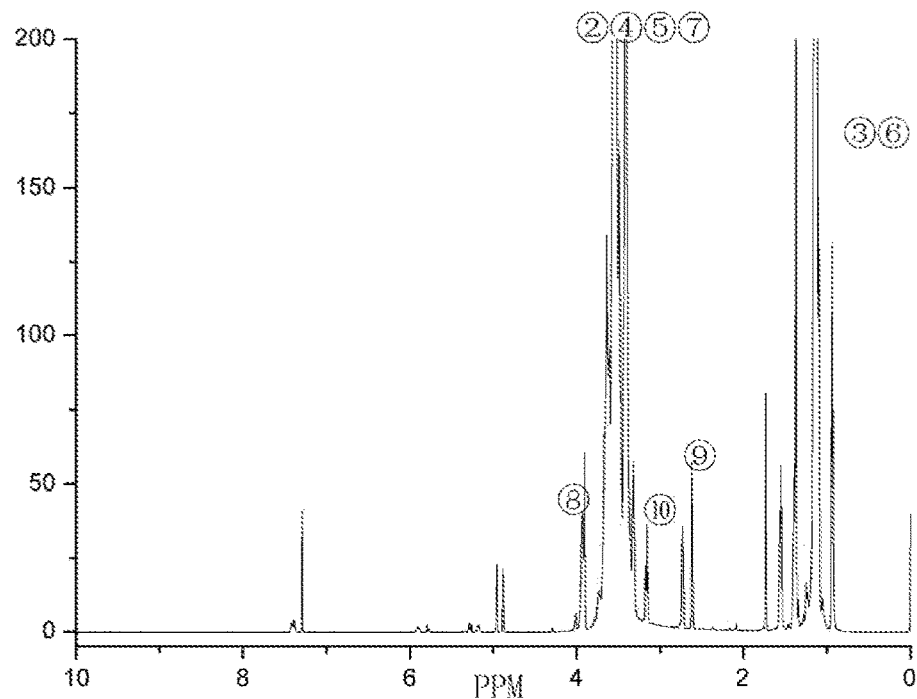

FIG. 2 is a $^1$H NMR spectrum of the epoxy polyether as an intermediate product of Example 1. In the figure, the peaks at 2.60-2.80 ppm and 3.01-3.20 ppm are the shift peaks of the epoxy hydrogen. The double bond peak at 4-6 ppm is significantly reduced, indicating that most of the terminal hydroxyl groups have been epoxidized.

Figure 3:
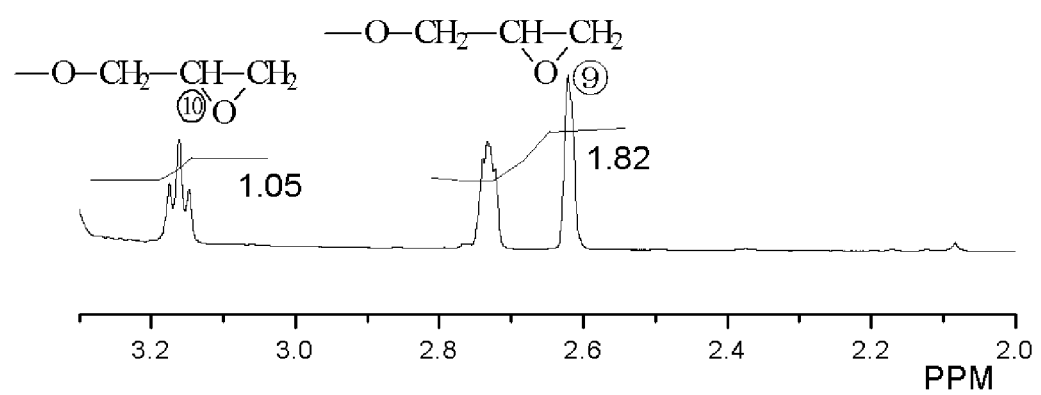
FIG. 3 is an enlarged NMR spectrum for the epoxy region of the epoxy polyether of Example 1.

FIG. 3 is an enlarged $^1$H NMR spectrum of the epoxy polyether as an intermediate product of of Example 1. It can be seen that the peak integration area at 3.20 ppm is about half the peak area at 2.61-2.80 ppm, just demonstrating the number of H⑩ is half the number of H⑨.

Figure 4:
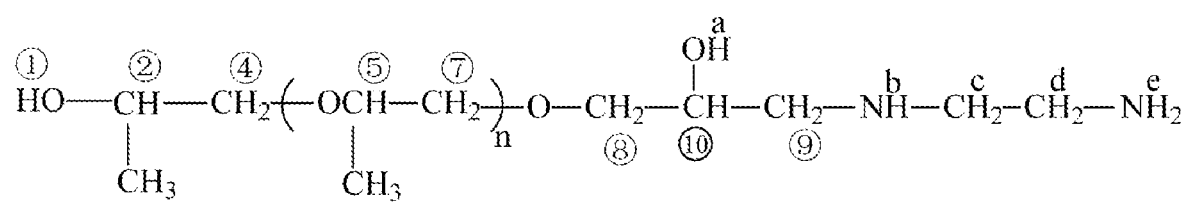
FIG. 4 is a $^1$H NMR spectrum of the polyetheramine of Example 1.
Figure 4:
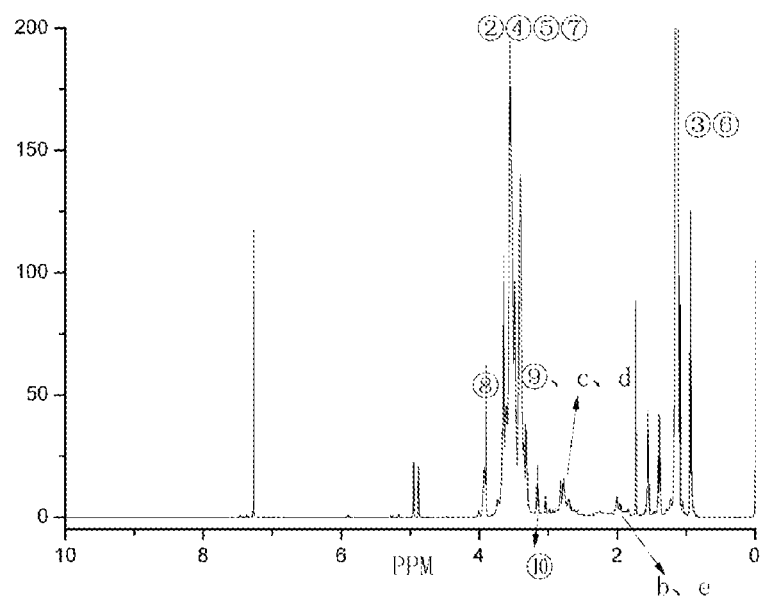

FIG. 4 is a $^1$H NMR spectrum of the polyetheramine as the product of Example 1. In the figure, the peaks at 3.3-4.0 ppm corresponds to the hydrogen ②④⑤⑦ of methylene in epoxy polyether, the peaks at 0.9-1.7 ppm corresponds to the hydrogen ③⑥ of methylin epoxy polyether, and the shift of the hydrogen of two methylene groups in the introduced ethylene diamine is located at 2.66-2.80 ppm. The hydrogen in the hydroxyl and amino groups is located at 1-6 ppm. The shift of a small amount of double bonds at 4-6 ppm demonstrates the alkenyl polyether is not completely reacted.

Figure 5:
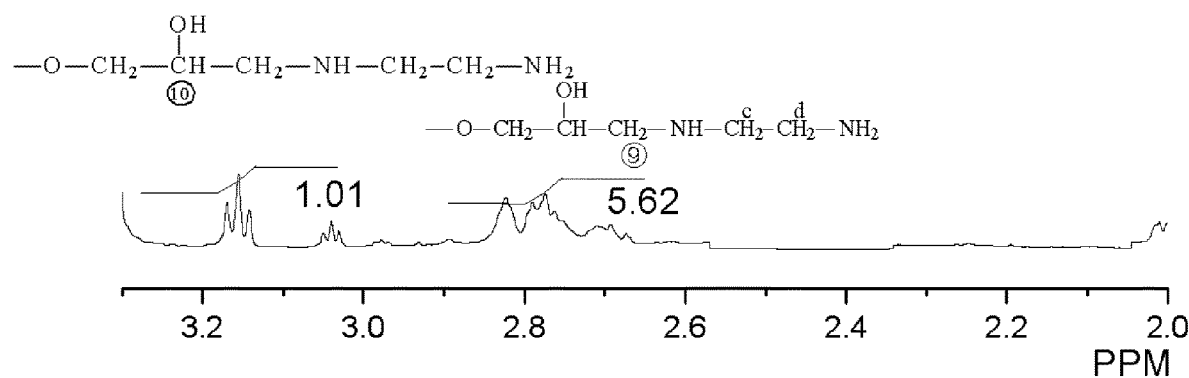
FIG. 5 is an enlarged NMR spectrum for the amino region of the polyetheramine of Example 1.

FIG. 5 is an partially enlarged $^1$H NMR spectrum of the polyetheramine as the product of Example 1. It can be seen that the peak integration area at 3.20 ppm (corresponding to H⑩, one hydrogen atom at said location) is about one sixth of the peak integration area at 2.80 ppm (corresponding to H⑨, Hc, Hd, six hydrogen atoms in total). The ratio of the peak areas at two locations is identical to the ratio of the hydrogen atom numbers at the corresponding position in the molecular formula.

Figure 6:
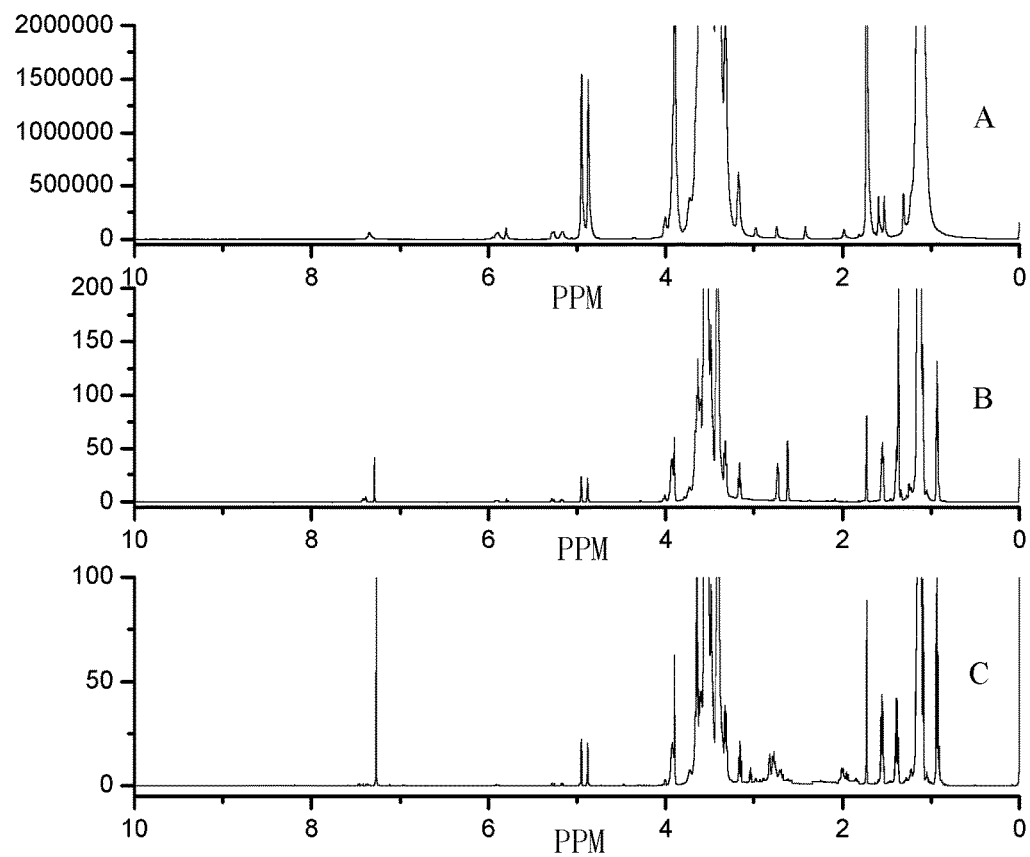
FIG. 6 is a comparison graph of the $^1$H NMR spectrum of alkenyl polyether, epoxy polyether, and polyetheramine in Example 1. In the figure, curves A, B, and C in order from top to bottom respectively represent the $^1$H NMR spectrum of alkenyl polyether, epoxy polyether, and polyetheramine.

FIG. 6 is a comparison graph of the $^1$H NR spectrum of alkenyl polyether, epoxy polyether (intermediate), and polyetheramine (product) in Example 1. In the figure, curves A, B, and C in order from top to bottom respectively represent the $^1$H NMR spectrum of alkenyl polyether, epoxy polyether, and polyetheramine.

As can be seen from the figure, for the curves B and C, the double bond peaks at 4-6 ppm are significantly reduced, indicating that most of the double bonds are completely reacted. The shift of the intermediate epoxy polyether occurs at 2.60-3.06 ppm, corresponding to H on the epoxy group. In the $^1$H NMR spectrum of the final polyetheramine, the hydrogen shift on the epoxy bond disappears, and the hydrogen on two methylene groups of ethylenediamine appears at 2.74-2.82 ppm.

Figure 7:
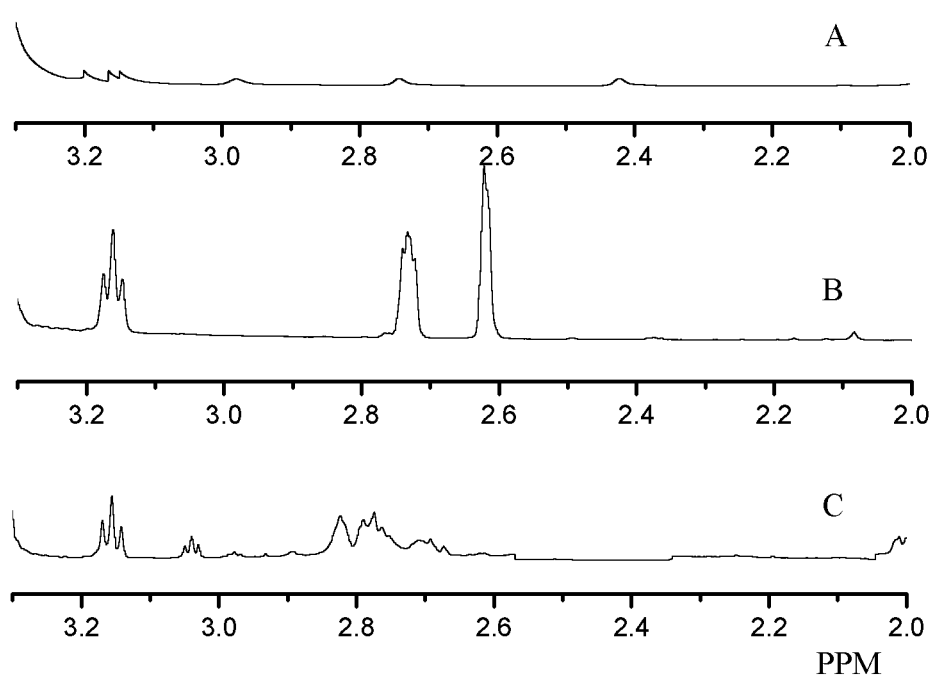
FIG. 7 is a comparison graph of the enlarged $^1$H NMR spectrum of alkenyl polyether, epoxy polyether, and polyetheramine in Example 1. In the figure, curves A, B, and C in order from top to bottom respectively represent the partially enlarged $^1$H NMR spectrum of alkenyl polyether, epoxy polyether, and polyetheramine.

FIG. 7 is a comparison graph of the enlarged $^1$H NMR spectrum of alkenyl polyether, epoxy polyether (intermediate), and polyetheramine (product) in Example 1. In the figure, curves A, B, and C in order from top to bottom respectively represent the partially enlarged $^1$H NMR spectrum of alkenyl polyether, epoxy polyether, and polyetheramine. For the curves B and C, the occurrence of the peak at 3.20 ppm corresponds to the formation of H⑩, and for the curve C, the occurrence of the peak at 2.74-2.82 ppm corresponds to the shift of hydrogen in the newly introduced ethylene diamine.

Example 2

1) Polyether Preparation

A mixture of 58 g of allyl alcohol and 1.5 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 696 g of propylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 19.19 gBr/100 g. The resulting polyether had a chemical formula of:

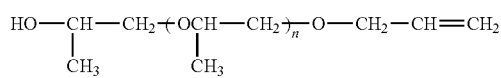

The average polymerization degree n of the resulting alkenyl terminated polyether was 11.

2) Epoxidation of Alkenyl Terminated Polyether

Under nitrogen protection, to a four-neck flask 754 g of alkenyl terminated polyether and 70 g of acetic acid were added. The mixture was warmed up to 60° C., and 755 g of hydrogen peroxide and 10 g of concentrated sulfuric acid (98%) were mixed and added dropwisely in two hours to the four-necked flask. The mixture was reacted for 2-8 hours. The product was washed with an aqeuous NaOH solution to a pH of about 7 and then water-washed for three times to produce, after drying and rotary evaporation, an epoxy polyether. The obtained epoxy polyether had a chemical formula of:

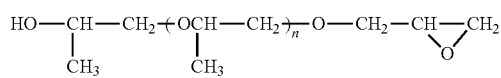

The average polymerization degree n of the obtained epoxy polyether was 11.

3) The above treated material was introduced to an amination reaction vessel, and 20-30 g of liquid ammonia and 5 g of triethylamine were added. The reaction was carried out at 200° C. for 2-6 hours to produce a crude polyetheramine product. The crude product was dried in rotary evaporation to produce a final polyetheramine product with a nitrogen content of 1.55% and a total conversion of 86.3%. The resulting polyetheramine had a chemical formula of:

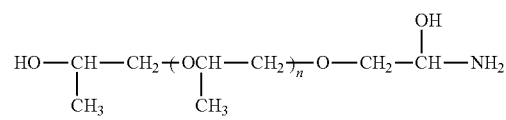

The average polymerization degree n of the resulting polyetheramine was 11.

Example 3

1) Polyether Preparation.

A mixture of 72.10 g of butenol and 1.5 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 864 g of butylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 16.71 gBr/100 g.

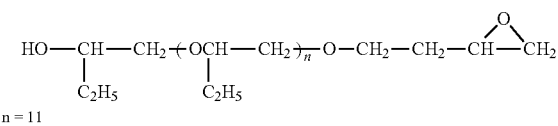

n = 11

2) Epoxidation of Alkenyl Terminated Polyether

Under nitrogen protection, to a four-neck flask 936 g of alkenyl terminated polyether was added. 172.57 g of meta-chloroperoxybenzoic acid was added dropwisely in two hours to the four-necked flask. The mixture was reacted for 2-8 hours. The product was washed successively with 5% NaSO$_3$ solution and 5% NaHCO$_3$ solution, and then water-washed for 5-6 times until the pH was about 7.0 to produce, after drying and rotary evaporation, an epoxy polyether.

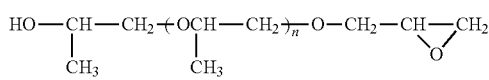

n = 11

3) The above treated material was introduced to an amination reaction vessel, and 61 g of ethanolamine and 10 g of triethylamine were added. The reaction was carried out at 150° C. for 2-6 hours to produce a crude polyetheramine product. The crude product was water-washed and dried in rotary evaporation to produce a final polyetheramine product with a nitrogen content of 0.89% and a total conversion of 63.6%.

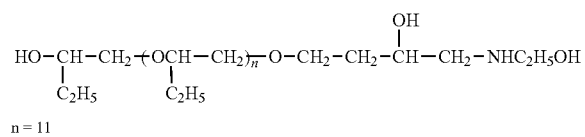

3) The above treated material was introduced to an amination reaction vessel, and 73 g of triethylene tetraamine and 1 g of triethylamine were added. The reaction was carried out at 150° C. for 2-6 hours to produce a crude polyetheramine product. The crude product was water-washed and dried in rotary evaporation to produce a final polyetheramine product with a nitrogen content of 3.58% and a total conversion of 55%.

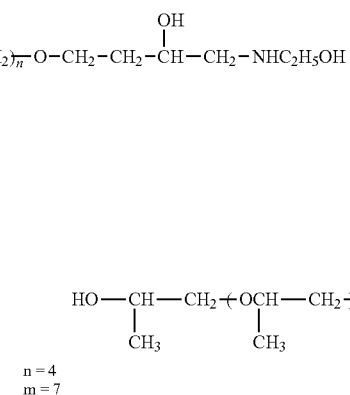

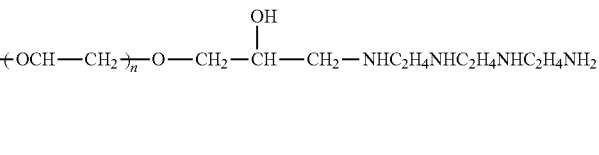

Example 4

1) Polyether Preparation

A mixture of 58 g of propenol and 1.5 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 176 g of ethylene oxide was introduced into and reacted in the reaction vessel under pressure until the pressure was not changed any more. Then 464 g of propylene oxide was added, and the mixture was continuously reacted at 140° C. until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 22.5 gBr/100 g.

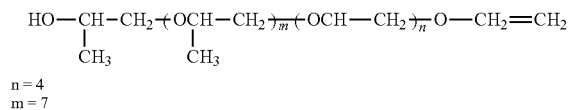

2) Epoxidation of Alkenyl Terminated Polyether

Under nitrogen protection, to a four-neck flask 810 g of alkenyl terminated polyether and 2 g of Ti—Si molecular sieve were added. The mixture was warmed up to 60° C., and 453 g of hydrogen peroxide was added dropwisely in two hours to the four-necked flask. The mixture was reacted for 2-8 hours, and allowed to stand and separated into layers. The oil layer was washed with 5% NaSO$_3$ solution, and then water-washed for 3 times to produce, after drying and rotary evaporation, an epoxy polyether.

Example 5

1) Polyether Preparation

A mixture of 114 g of 3-methyl5-hexenol and 1.2 g of NaOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 232 g of propylene oxide was introduced into and reacted in the reaction vessel under pressure until the pressure was not changed any more, 576 g of butylene oxide was added, and the mixture was continuously reacted at 140° C. until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 17.20 gBr/100 g.

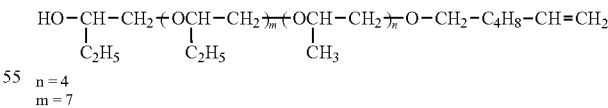

2) Epoxidation of Alkenyl Terminated Polyether

Under nitrogen protection, to a four-neck flask 914 g of alkenyl terminated polyether was added and 80 g of peracetic acid was added dropwisely in two hours to the four-necked flask. The mixture was reacted for 2-8 hours. The product was washed successively with 5% NaSO$_3$ solution and 5% NaHCO$_3$ solution, and then water-washed for 5-6 times until the pH was about 7.0 to produce, after drying and rotary evaporation, an epoxy polyether.

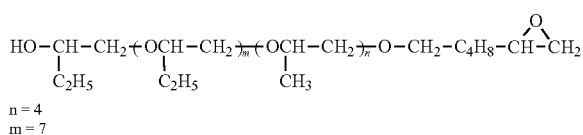

n = 4
m = 7

3) The above treated material was introduced to an amination reaction vessel, and 30 g of ethylene diamine and 1 g of triethylamine were added. The reaction was carried out at 150° C. for 2-6 hours to produce a crude polyether-amine product. The crude product was water-washed and dried in rotary evaporation to produce a final polyetheramine product with a nitrogen content of 1.32% and a total conversion of 89%.

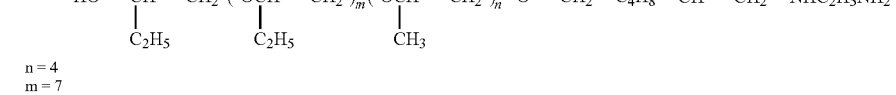

n = 4
m = 7

Example 6

1) Polyether Preparation

A mixture of 58 g of allyl alcohol and 2.0 g of NaOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 870 g of propylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 18.79 g/100 mL. The obtained polyether had a chemical formula of:

$$HO-CH(CH_3)-CH_2-(OCH(CH_3)-CH_2)_n-O-CH_2-CH=CH_2$$

The average polymerization degree n of the resulting alkenyl terminated polyether was 14.

2) Epoxidation of Alkenyl Terminated Polyether

Under nitrogen protection, to a four-neck flask 928 g of alkenyl terminated polyether and 75 g of formic acid were added. The mixture was warmed up to 60° C., and 566 g of hydrogen peroxide (well mixed) was added dropwisely in two hours to the four-necked flask. The mixture was reacted for 2-8 hours. The product was washed with an aqueous NaOH solution to a pH of about 7 and then water-washed for three times to produce, after drying and rotary evaporation, an epoxy polyether. The obtained epoxy polyether had a chemical formula of:

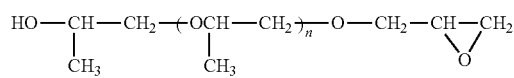

The average polymerization degree n of the obtained epoxy polyether was 14.

3) The above treated material was introduced to an amination reaction vessel, 75 g of ethylene diamine and 23 g of sodium phenoxide were added, the reaction was carried out at 150° C. for 2-6 hours to produce a crude polyether-amine product. The crude product was water-washed and dried in rotary evaporation to produce a final polyetheramine product with a nitrogen content of 2.97% and a total conversion of 68%. The resulting polyetheramine had a chemical formula of:

$$HO-CH(CH_3)-CH_2-(OCH(CH_3)-CH_2)_n-O-CH_2-CH(OH)-CH_2-NH-CH_2-CH_2-NH_2$$

The average polymerization degree n of the resulting polyetheramine was 14.

Example 7

1) Polyether Preparation

A mixture of 72.10 g of butenol and 2.0 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 1080 g butylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 13.01 gBr/100 mL.

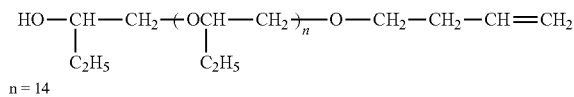

2) Epoxidation of Alkenyl Terminated Polyether

Under nitrogen protection, to a four-neck flask 1152 g of alkenyl terminated polyether were added. 215.77 g of meta-chloroperoxybenzoic acid was added dropwisely in two hours to the four-necked flask. The mixture was reacted for 2-8 hours. The product was washed successively with 5% $NaSO_3$ solution and 5% $NaHCO_3$ solution, and then water-washed for 5-6 times until the pH was about 7.0 to produce, after drying and rotary evaporation, an epoxy polyether.

HO—CH—CH$_2$—(OCH—CH$_2$)$_n$—O—CH$_2$—CH$_2$—CH—CH$_2$ (epoxide)
    |              |
    C$_2$H$_5$     C$_2$H$_5$
n = 14

3) The above treated material was introduced to an amination reaction vessel, and 61 g of ethanolamine and 11 g of hydroquinone were added. The reaction was carried out at 150° C. for 2-6 hours to produce a crude polyetheramine product. The crude product was water-washed and dried in rotary evaporation to produce a final polyetheramine product with a nitrogen content of 0.73% and a total conversion of 60.31%.

HO—CH—CH$_2$—(OCH—CH$_2$)$_n$—O—CH$_2$—CH$_2$—CH(OH)—CH$_2$—NHC$_2$H$_5$OH
    |              |
    C$_2$H$_5$     C$_2$H$_5$
n = 14

Example 8

1) Polyether Preparation

A mixture of 58 g of propenol and 2.0 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 220 g of ethylene oxide was introduced into and reacted in the reaction vessel under pressure until the pressure was not changed any more. Then 692 g of propylene oxide was added, and the mixture was continuously reacted at 140° C. until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 13.01 gBr/100 mL.

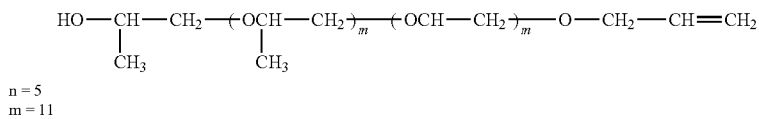

2) Epoxidation of Alkenyl Terminated Polyether

Under nitrogen protection, to a four-neck flask 970 g of alkenyl terminated polyether and 2.5 g of Ti—Si molecular sieve were added. The mixture was warmed up to 60° C., and 566 g of hydrogen peroxide was added dropwisely in two hours to the four-necked flask. The mixture was reacted for 2-8 hours, and allowed to stand and separated into layers. The oil layer was washed with 5% $NaSO_3$ solution, and then water-washed for 3 times to produce, after drying and rotary evaporation, an epoxy polyether.

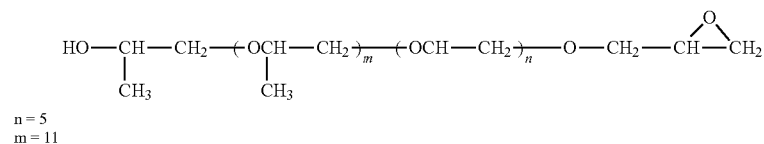

n = 5
m = 11

3) The above treated material was introduced to an amination reaction vessel, and 91 g of triethylene tetraamine and 1.25 g of triethylamine were added. The reaction was carried out at 150° C. for 2-6 hours to produce a crude polyetheramine product. The crude product was water-washed and dried in rotary evaporation to produce a final polyetheramine product with a nitrogen content of 3.17% and a total conversion of 55%.

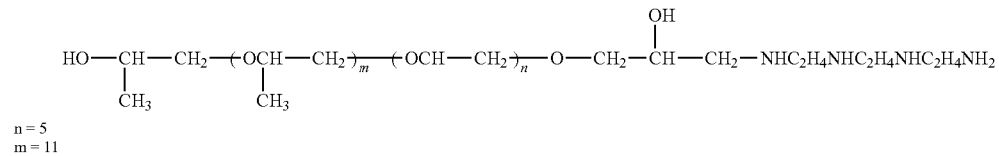

n = 5
m = 11

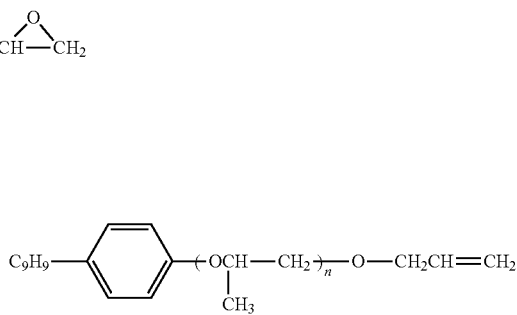

n = 12

Example 9

1) Polyether Preparation

A mixture of 220 g of nonyl phenol and 2.0 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 696 g of propylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, a nonylphenol polyether product was obtained. The obtained polyether had a chemical formula of:

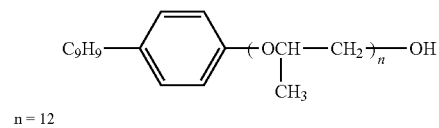

n = 12

2) 898 g of polyether, the product obtained in step 1), was added to 59 g sodium methoxide. The mixture was reacted to produce sodium polyether alcoholate. Then 76.5 g of allyl chloride was added. The reaction was carried out at 50-150° C. for 2-10 h. After the completion of the reaction, the unreacted allyl chloride was removed under vacuum, and the crude product was refined to produce the alkenyl terminated polyether having a structure of:

3) Epoxidation of Alkenyl Terminated Polyether

Under nitrogen protection, to a four-neck flask 939 g of polyether and 75 g of formic acid were added. The mixture was warmed up to 60° C., and 453 g of hydrogen peroxide (well mixed) was added dropwisely in two hours to the four-necked flask. The mixture was reacted for 2-8 hours. The product was washed with an aqeuous NaOH solution to a pH of about 7 and then water-washed for three times to produce, after drying and rotary evaporation, an epoxy polyether. The obtained epoxy polyether had a chemical formula of:

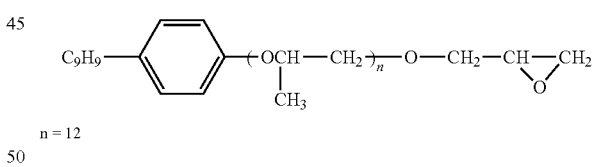

n = 12

4) The above treated material was introduced to an amination reaction vessel, and 60 g of ethylene diamine and 10 g of n-butanol were added. The reaction was carried out at 150° C. for 2-6 hours to produce a crude polyetheramine product. The crude product was water-washed and dried in rotary evaporation to produce a final polyetheramine product with a nitrogen content of 2.15% and a total conversion of 77%. The resulting polyetheramine had a chemical formula of:

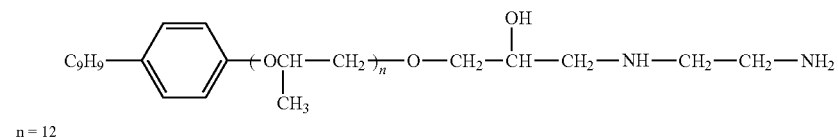

n = 12

Example 10

1) Polyether Preparation

A mixture of 220 g of nonyl phenol and 2.0 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 864 g of butylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, a nonylphenol polyether product was obtained.

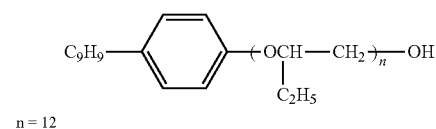

n = 12

2) The product obtained in step 1), 1066 g of polyether was added to 44 g of NaOH. The mixture was reacted to produce sodium polyether alcoholate. Then 76.5 g of allyl chloride was added. The reaction was carried out at 50-150° C. for 2-10 h. After the completion of the reaction, the unreacted allyl chloride was removed under vacuum, and the crude product was refined.

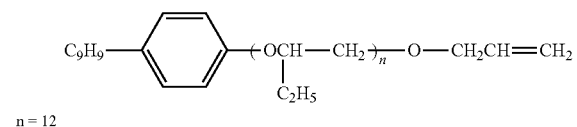

n = 12

3) Epoxidation of Alkenyl Terminated Polyether

Under nitrogen protection, to a four-neck flask 1121 g of alkenyl terminated polyether were added. 172.57 g of meta-chloroperoxybenzoic acid was added dropwisely in two hours to the four-necked flask. The mixture was reacted for 2-8 hours. The product was washed successively with 5% NaSO$_3$ solution and 5% NaHCO$_3$ solution, and then water-washed for 5-6 times until the pH was about 7.0 to produce, after drying and rotary evaporation, an epoxy polyether.

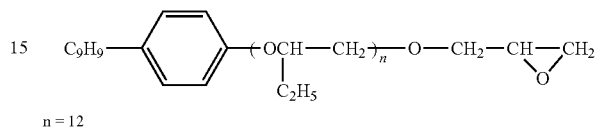

n = 12

4) The above treated material was introduced to an amination reaction vessel, 61 g of ethanolamine and 10 g of triethylamine were added. The reaction was carried out at 150° C. for 2-6 hours to produce a crude polyetheramine product. The crude product was water-washed and dried in rotary evaporation to produce a final polyetheramine product with a nitrogen content of 0.98% and a total conversion of 83%.

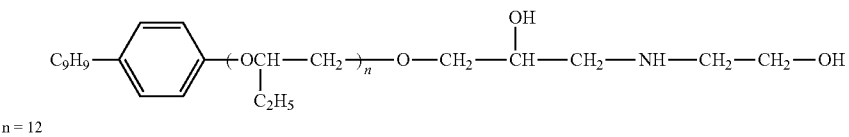

n = 12

Example 11

1) Polyether Preparation

A mixture of 84 g of 5-hydroxyl-1,3-pentadiene and 1.5 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 696 g of propylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, an alkenyl terminated polyether product was obtained, and the bromine value of the product was 35.90 gBr/100 g.

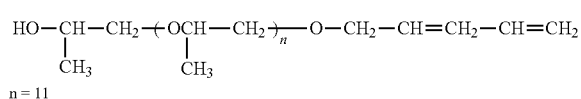

n = 11

2) Epoxidation of Alkenyl Terminated Polyether

Under nitrogen protection, to a four-neck flask 762 g of alkenyl terminated polyether and 120 g of formic acid were added. The mixture was warmed up to 60° C., and 906 g of hydrogen peroxide (well mixed) was added dropwisely in two hours to the four-necked flask. The mixture was reacted for 2-8 hours. The product was washed with an aqueous NaOH solution to a pH of about 7 and then water-washed for three times to produce, after drying and rotary evaporation, an epoxy polyether.

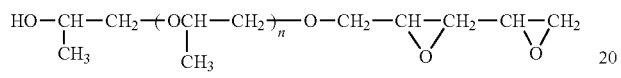

n = 11

3) The above treated material was introduced to an amination reaction vessel, 120 g of ethylene diamine and 20 g of n-butanol were added. The reaction was carried out at 150° C. for 2-6 hours to produce a crude polyetheramine product. The crude product was water-washed and dried in rotary evaporation to produce a final polyetheramine product with a nitrogen content of 4.94% and a total conversion of 81%.

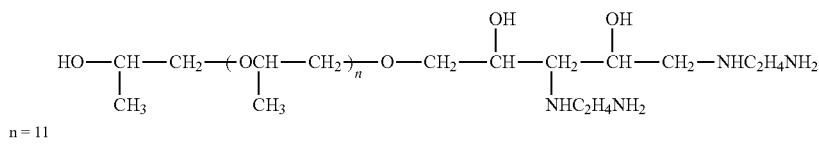

n = 11

Example 12

1) Polyether Preparation

A mixture of 220 g of nonyl phenol and 2.0 g of KOH was added to a reaction vessel. The reaction vessel was purged with nitrogen to remove air therein. The reaction vessel was then sealed and heated to 110° C. and depressurized to 2000 Pa. After evaporating off the moisture, the nitrogen gas was introduced to the reaction vessel, and the reaction vessel was pressurized to normal pressure and heated to about 140° C., 696 g of propylene oxide was introduced into and reacted in the reaction vessel under pressure until the pressure was not changed any more. After the completion of reaction, the reactants were cooled to room temperature, neutralized with acetic acid, and water-washed to remove the catalyst. After removing moisture and volatile substances under vacuum, a nonyl phenol polyether product was obtained,

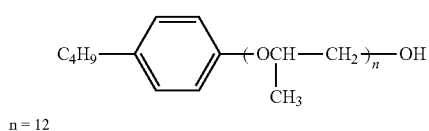

n = 12

2) the product obtained in step 1), 898 g of polyether was added to 59 g sodium methoxide. The mixture was reacted to produce sodium polyether alcoholate. Then 103.5 g of 5-chloro-1,3-pentadiene was added. The reaction was carried out at 50-150° C. for 2-10 h. After the completion of the reaction, the unreacted allyl chloride was removed under vacuum, and the crude product was refined to produce the alkenyl terminated polyether having a structure of:

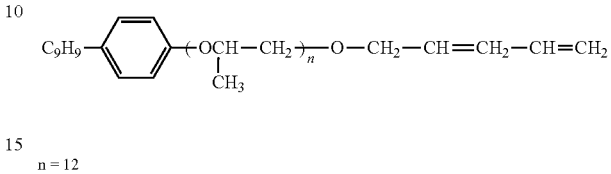

n = 12

3) Epoxidation of Alkenyl Terminated Polyether

Under nitrogen protection, to a four-neck flask 966 g of polyether and 150 g of formic acid were added. The mixture was warmed up to 60° C., and 906 g of hydrogen peroxide (well mixed) was added dropwisely in two hours to the four-necked flask. The mixture was reacted for 2-8 hours. The product was washed with an aqueous NaOH solution to a pH of about 7 and then water-washed for three times to produce, after drying and rotary evaporation, an epoxy polyether.

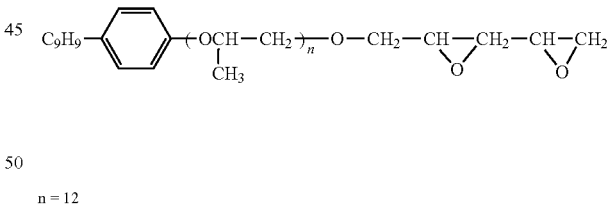

n = 12

4) The above treated material was introduced to an amination reaction vessel, and 120 g of ethylene diamine and 20 g of n-butanol were added. The reaction was carried out at 150° C. for 2-6 hours to produce a crude polyetheramine product. The crude product was water-washed and dried in rotary evaporation to produce a final polyetheramine product with a nitrogen content of 3.96% and a total conversion of 79%. The resulting polyetheramine had a chemical formula of:

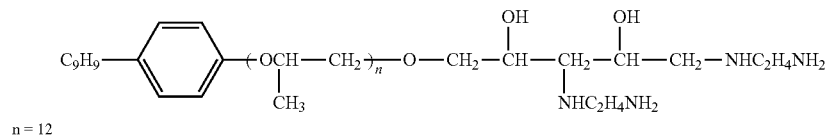

n = 12

Comparative Example 1

1) Polyether Preparation

A mixture of 1.5 g of KOH was added to the reaction vessel. The reaction vessel was purged with nitrogen to remove air therein and heated to about 140° C. About 696 g of propylene oxide was introduced into and reacted in the reaction vessel under pressure until the pressure was not changed any more, and the mixture was continuously reacted at 140° C. until the pressure was not changed any more. After the completion of reaction, the reactants were cooled to room temperature, neutralized with acetic acid, and water-washed to remove the catalyst.

After removing moisture and volatile substances under vacuum, a polyether product was obtained. The product polyether had a hydroxy value of 136 mgKOH/g and a molecular weight of 696.

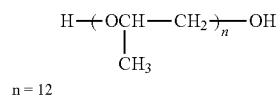

n = 12

2) To a 1 L autoclave the polyether obtained in step 1), 45 g of a modified Raney nickel catalyst and 60 g of ethylene diamine were added. Hydrogen was added until the initial pressure reached 10.0-14.0 MPa. The mixture was heated and reacted at 200-240° C. for several hours while keeping the same temperature. After the completion of the reaction, the reaction mixture was cooled to room temperature. The gas was vented from the autoclave, and the autoclave was opened. The reaction mixture was discharged, and filtered to remove the catalyst. Then, the liquid was distilled under vacuum to remove water and excessive liquid ammonia to produce the polyetheramine product. After analysis, the product had a nitrogen content of 3.51% and a conversion of 93%, had a structural formula of:

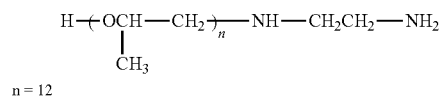

n = 12

Comparative Example 2

1) Polyether Preparation

A mixture of 1.5 g of KOH was added to the reaction vessel. The reaction vessel was purged with nitrogen to remove air therein and heated to about 140° C. About 696 g of propylene oxide was introduced into and reacted in the reaction vessel under pressure until the pressure was not changed any more, and the mixture was continuously reacted at 140° C. until the pressure was not changed any more. After the completion of reaction, the reactants were cooled to room temperature, neutralized with acetic acid, and water-washed to remove the catalyst. After removing moisture and volatile substances under vacuum, a polyether product was obtained. The product polyether had a hydroxy value of 136 mgKOH/g and a molecular weight of 696.

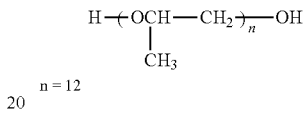

n = 12

2) To a 1 L autoclave the polyether obtained in step 1), 45 g of a modified Raney nickel catalyst and 2 kg of ammonia gas were added. Hydrogen was added until the initial pressure reached 10.0-14.0 MPa. The mixture was heated and reacted at 200-240° C. for several hours while keeping the same temperature. After the completion of the reaction, the reaction mixture was cooled to room temperature. The gas was vented from the autoclave, and the autoclave was opened. The reaction mixture was discharged, and filtered to remove the catalyst. Then, the liquid was distilled under vacuum to remove water and excessive liquid ammonia to produce the polyetheramine product. After analysis, the product had a nitrogen content of 3.77% and a conversion of 98.43%, had a structural formula of:

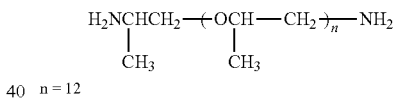

n = 12

Comparative Example 3

1) Polyether Preparation

A mixture of 220 g of nonyl phenol and 2.0 g of KOH was added to a reaction vessel. The reaction vessel was purged with nitrogen to remove air therein and heated to about 140° C. About 696 g of propylene oxide was introduced into and reacted in the reaction vessel under pressure until the pressure was not changed any more, and the mixture was continuously reacted at 140° C. until the pressure was not changed any more. After the completion of reaction, the reactants were cooled to room temperature, neutralized with acetic acid, and water-washed to remove the catalyst. After removing moisture and volatile substances under vacuum, a polyether product was obtained with a molecular weight of 898.

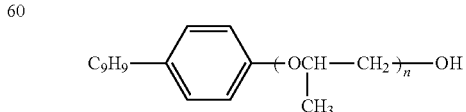

n = 12

2) To a 1 L autoclave the polyether obtained in step 1), 45 g of a modified Raney nickel catalyst and 2 kg of ammonia gas were added. Hydrogen was added until the initial pressure reached 10.0-14.0 MPa. The mixture was heated and reacted at 200-240° C. for several hours while keeping the same temperature. After the completion of the reaction, the reaction mixture was cooled to room temperature. The gas was vented from the autoclave, and the autoclave was opened. The reaction mixture was discharged, and filtered to remove the catalyst. Then, the liquid was distilled under vacuum to remove water and excessive liquid ammonia to produce the polyetheramine product. After analysis, the product had a nitrogen content of 1.35% and a conversion of 88%, had a structural formula of:

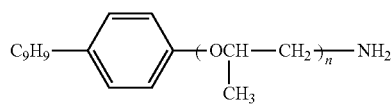

n = 12

Comparative Example 4

1) Polyether Preparation

A mixture of 1.5 g of KOH was added to the reaction vessel. The reaction vessel was purged with nitrogen to remove air therein and heated to about 140° C. About 696 g of propylene oxide was introduced into and reacted in the reaction vessel under pressure until the pressure was not changed any more, and the mixture was continuously reacted at 140° C. until the pressure was not changed any more. After the completion of reaction, the reactants were cooled to room temperature, neutralized with acetic acid, and water-washed to remove the catalyst. After removing moisture and volatile substances under vacuum, a polyether product was obtained. The product polyether had a hydroxy value of 136 mgKOH/g and a molecular weight of 696.

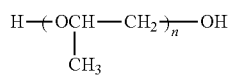

n = 12

2) To a 1 L autoclave the polyether obtained in step 1), 45 g of a modified Raney nickel catalyst and 30 g of ethylene diamine were added. Hydrogen was added until the initial pressure reached 10.0-14.0 MPa. The mixture was heated and reacted at 200-240° C. for several hours while keeping the same temperature. After the completion of the reaction, the reaction mixture was cooled to room temperature. The gas was vented from the autoclave, and the autoclave was opened. The reaction mixture was discharged, and filtered to remove the catalyst. Then, the liquid was distilled under vacuum to remove water and excessive liquid ammonia to produce the polyetheramine product. After analysis, the product had a nitrogen content of 1.12% and a conversion of 58%, had a structural formula of:

n = 12

The fuel oil detergents in Examples and Comparative Examples were evaluated respectively for the deposition inhibition performance. The results were shown in Table 1.

TABLE 1

Evaluation Results of Deposit Formation Inhibition Performance

| Detergent | Amount/(μg · g$^{-1}$) | m(deposit)/mg | deposit reduction rate/% |
|---|---|---|---|
| Blank | — | 11.70 | — |
| Example 1 | 300 | 1.31 | 88.89 |
|  | 400 | 1.20 | 89.15 |
| Example 2 | 300 | 0.10 | 99.15 |
|  | 400 | 0.10 | 99.15 |
| Example 3 | 300 | 0.90 | 92.31 |
|  | 400 | 0.91 | 92.22 |
| Example 4 | 300 | 0.40 | 96.58 |
|  | 400 | 0.34 | 97.09 |
| Example 5 | 300 | 0.21 | 98.29 |
|  | 400 | 0.19 | 98.37 |
| Example 6 | 300 | 1.60 | 86.32 |
|  | 400 | 1.31 | 88.89 |
| Example 7 | 300 | 1.10 | 90.60 |
|  | 400 | 1.02 | 91.45 |
| Example 8 | 300 | 0.91 | 92.31 |
|  | 400 | 1.00 | 91.45 |
| Example 9 | 300 | 1.09 | 90.68 |
|  | 400 | 0.98 | 91.62 |
| Example 10 | 300 | 0.09 | 99.23 |
|  | 400 | 1.00 | 99.15 |
| Example 11 | 300 | 0.33 | 97.18 |
|  | 400 | 0.28 | 97.60 |
| Example 12 | 300 | 0.32 | 97.26 |
|  | 400 | 0.29 | 97.52 |
| Comparative Example 1 | 300 | 1.44 | 87.69 |
|  | 400 | 1.39 | 88.12 |
| Comparative Example 2 | 300 | 2.37 | 79.74 |
|  | 400 | 2.01 | 82.82 |
| Comparative Example 3 | 300 | 1.11 | 90.51 |
|  | 400 | 1.17 | 90.00 |
| Comparative Example 4 | 300 | 11.21 | 4.19 |
|  | 400 | 10.27 | 12.22 |

The invention claimed is:

1. An amino polymer, having a structure of formula (II),

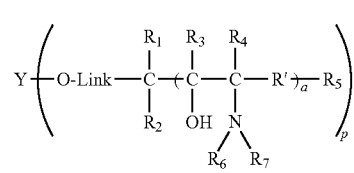

(II)

wherein p is 1, 2, or 3;
  wherein the group Y is a hydroxyl polymer having p number of bonds connected to the p number of —O— groups,
  the group Link represents a linking group, wherein each of the p number of Link groups is independently selected from $C_{1-4}$ linear or branched alkylene;
  $R_1$ and $R_2$ are identical to or different from each other, and are each independently selected from $C_{1-4}$ linear or branched alkyl;
  the a number of $R_3$ groups or the a number of $R_4$ groups are identical to or different from each other, and are each independently selected from hydrogen and $C_{1-10}$ hydrocarbyl;
  the a number of $R_6$ groups or the a number of $R_7$ groups are identical to or different from each other, and are each independently selected from hydrogen, optionally substituted $C_{1-10}$ hydrocarbyl, and

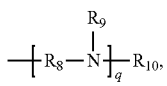

wherein the q number of $R_8$ groups and identical to or different from each other, and are each independently selected from $C_{1-40}$ hydrocarbylene; the q number of $R_9$ groups and identical to or different from each other, and are each independently selected from hydrogen and $C_{1-10}$ hydrocarbyl; $R_{10}$ is selected from hydrogen and $C_{1-10}$ hydrocarbyl;
wherein q is an integer between 1 and 50, inclusive; a is an integer between 1 and 10, inclusive;
the a number of R' groups are identical to or different from each other, and are each independently selected from a single bond and $C_{1-10}$ hydrocarbylene; and $R_5$ is selected from hydrogen and $C_{1-10}$ hydrocarbyl.

2. The amino polymer according to claim 1, wherein the group Y has a structure obtained by removing hydrogen from the p number of hydroxyl groups from a hydroxyl polymer having p' number of hydroxyl groups, wherein $1 \le p \le p'$.

3. The amino polymer according to claim 2, wherein said hydroxyl polymer is selected from a polyether, a polyester having, an alkylene diol polymer, and a polyether represented by formula (III),

 (III)

wherein, $R_0$ is selected from hydrogen atom, optionally substituted $C_{1-50}$ hydrocarbyl, $C_{1-20}$ linear or branched alkyl, $C_{6-10}$ monocyclic or polycyclic aryl substituted by one or more $C_{1-20}$ linear or branched alkyl groups, $C_{3-20}$ monocyclic or polycyclic cycloalkyl substituted by one or more $C_{1-20}$ linear or branched alkyl groups, $C_{5-15}$ linear or branched alkyl, and phenyl substituted by one or more $C_{5-15}$ linear or branched alkyl groups;
wherein the y number of Ru groups are identical to or different from each other, and are each independently selected from $C_{2-24}$ linear or branched alkylene, $C_{2-12}$ linear or branched alkylene, $C_{2-6}$ linear or branched alkylene, —$CH_2$—$CH_2$—, and —$CH_2$—$CH(CH_3)$—;
wherein y represents an average polymerization degree of the polyether segment —O—Ru—, and is a number between 1 and 200.

4. The amino polymer according to claim 1, having a structure represented by formula (II-A), a structure represented by formula (II-B), or is a polyetheramine represented by formula (II-C), and having a molecular weight Mn of 600-2000,

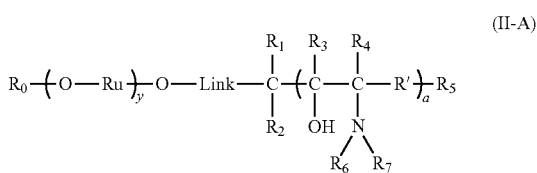 (II-A)

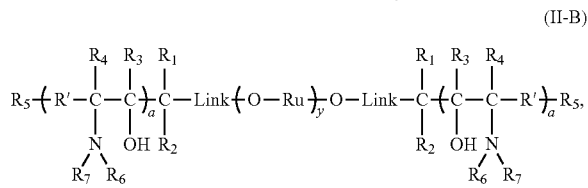 (II-B)

wherein $R_0$ is selected from hydrogen atom, optionally substituted $C_{1-50}$ hydrocarbyl, $C_{1-20}$ linear or branched alkyl, $C_{6-10}$ aryl substituted by $C_{1-20}$ linear or branched alkyl groups, and $C_{3-20}$ cycloalkyl substituted by $C_{1-20}$ linear or branched alkyl groups, $C_{5-15}$ linear or branched alkyl, phenyl substituted by $C_{5-15}$ linear or branched alkyl groups;
wherein the y number of Ru groups are identical to or different from each other, and are each independently selected from $C_{2-24}$ linear or branched alkylene, $C_{2-12}$ linear or branched alkylene, $C_{2-6}$ linear or branched alkylene, —$CH_2$—$CH_2$—, and —$CH_2$—$CH(CH_3)$—;
wherein y represents an average polymerization degree of the polyether segment —O—Ru—, and is a value between 1 and 200,

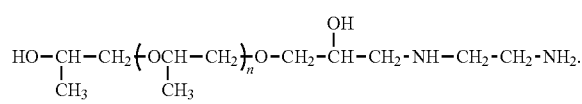 (II-C)

5. A process for preparing the amino polymer of claim 1, comprising:
1) optionally producing an alkenyl polymer represented by formula (A-I)

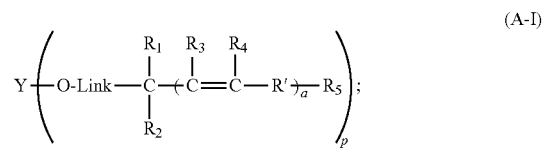 (A-I)

2) oxidizing said alkenyl polymer with an oxidant selected from oxygen, ozone, hydrogen peroxide, metal oxide, metal peroxide, dichromic acid and salt thereof, permanganic acid and salt thereof, peracid and salt thereof, hypohalous acid and salt thereof, organic hydroperoxide, organic peroxide, an organic peroxo acid, performic acid, peracetic acid, peroxypropionic acid, peroxybutyric acid, peroxybenzoic acid or meta-chloroperoxybenzoic acid, and a mixture thereof, wherein at least one group

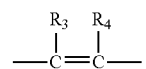

in said alkenyl polymer is oxidized to

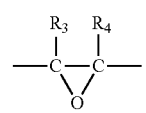

to obtain an oxidization product; and
3) aminating the oxidation product obtained in step 2) with an aminating agent represented by formula (B-I),

(B-1)

wherein the group

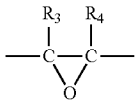

is aminated to

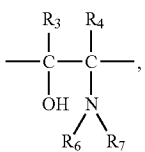

6. The process according to claim 5, wherein step (1) comprises reacting the hydroxyl polymer represented by formula (A-II) with an alkenyl compound represented by formula (A-III) to produce the alkenyl polymer represented by the formula (A-I),

 (A-II)

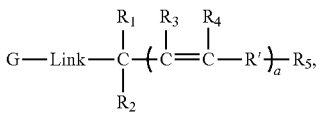 (A-III)

wherein the group G represents halogen or hydroxyl.

7. The process according to claim 6, further comprising:
B-1) reacting the alkenyl compound represented by formula (A-III) and at least one alkylene oxide represented by formula (A-IV) to produce an alkenyl polyether represented by formula (A-V),

 (A-IV)

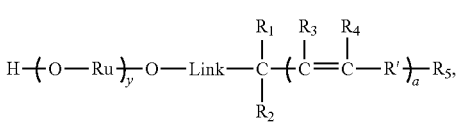 (A-V)

and, during or after said step B-1), reacting compound represented by formula (A-VI) with the alkenyl polyether represented by the formula (A-V) to produce the alkenyl polyether represented by formula (A-VII), and/or reacting the alkenyl compound represented by formula (A-III) with the alkenyl polyether represented by the formula (A-V) to produce the alkenyl polyether represented by formula (A-VIII),

G'-R'$_0$ (A-VI)

wherein, the group G' represents halogen or hydroxyl; R'$_0$ is selected from optionally substituted $C_{1-50}$ hydrocarbyl, $C_{1-20}$ linear or branched alkyl, $C_{6-10}$ aryl substituted by $C_{1-20}$ linear or branched alkyl groups, $C_{3-20}$ cycloalkyl substituted by $C_{1-20}$ linear or branched alkyl groups, $C_{5-15}$ linear or branched alkyl, and phenyl substituted by $C_{5-15}$ linear or branched alkyl groups,

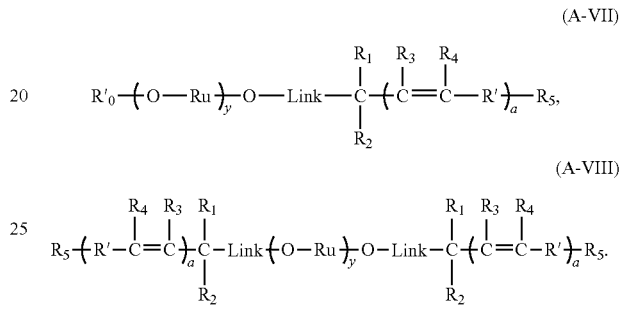

8. A fuel oil detergent, comprising the amino polymer according to claim 1, and optionally comprising a diluent selected from polyolefin, mineral base oil, polyether, and a mixture thereof.

9. The fuel oil detergent according to claim 8, wherein said amino polymer is 10-70% of a total weight of the fuel oil detergent.

10. A fuel oil composition, comprising the amino polymer according to claim 1 and a base fuel, wherein a concentration of the amino polymer in the fuel oil composition, based on a total weight of the fuel oil composition, is 30-2000 mg/kg.

11. A fuel oil detergent, comprising the amino polymer produced by the process according to claim 5, and a diluent selected from polyolefin, mineral base oil, polyether, and a mixture thereof.

12. The fuel oil composition according to claim 10, wherein the concentration of the amino polymer is 50-2000 mg/kg.

13. The fuel oil composition according to claim 10, wherein the concentration of the amino polymer is 50-1000 mg/kg.

14. The fuel oil detergent according to claim 8, wherein said amino polymer is 30-70% of the total weight of the fuel oil detergent.

15. The fuel oil detergent according to claim 8, wherein said amino polymer is 50-70% of the total weight of the fuel oil detergent.

16. The method of claim 6, wherein the alkenyl compound represented by formula (A-III) is selected from allyl alcohol, 3-buten-1-ol, 3-buten-2-ol, 3-methyl-3-buten-1-ol, 4-penten-1-ol, 4-penten-2-ol, 4-penten-3-ol, 3-methyl-4-penten-1-ol, 2-methyl-4-penten-1-ol, 3-ethyl-4-penten-1-ol, 2-ethyl-4-penten-1-ol, 3-isobutyl-4-penten-1-ol, 2-isobutyl-4-penten-1-ol, 2,3-dimethyl-4-penten-1-ol, 2,2-dimethyl-4-penten-1-ol, 3,3-dimethyl-4-penten-1-ol, 5-hexen-1-ol, 4-methyl-5-hexenol, 3-methyl-5-hexenol, 2-methyl-5-hexenol, 3-ethyl-5-hexenol, 5-hexen-2-ol, 5-hexen-3-ol, 5-hexen-4-ol, 6-hepten-1-ol, 2-methyl-6-hepten-1-ol, 3-methyl-6-hepten-1-ol, 4-methyl-6-hepten-1-ol, 5-methyl-6-hepten-1-ol, 2-ethyl-6-hepten-1-ol, 3-ethyl-6-hepten-1-ol, 4-ethyl-6-hepten-1-ol, 5-ethyl-6-hepten-1-ol, 2-methyl-7-octen-1-ol, 3-methyl-7-octen-1-ol, 4-methyl-7-octen-1-ol, 5-methyl-7-octen-1-ol, 6-methyl-7-octen-1-ol, 3-ethyl-7-octen-1-ol, 9-decen-1-ol, 10-undecen-1-ol, 11-dodecen-1-ol, allyl halide, 3-buten-1-halogen, 3-buten-2-halogen, 3-methyl-3-buten-1-halogen, 4-penten-1-halogen, 4-penten-2-halogen, 4-penten-3-halogen, 3-methyl-4-penten-1-halogen, 2-methyl-4-penten-1-halogen, 3-ethyl-4-penten-1-halogen, 2-ethyl-4-penten-1-halogen, 3-isobutyl-4-penten-1-halogen, 2-isobutyl-4-penten-1-halogen, 2,3-dimethyl-4-penten-1-halogen, 2,2-dimethyl-4-penten-1-halogen, 3,3-dimethyl-4-penten-1-halogen, 5-hexen-1-halogen, 4-methyl-5-hexene halogen, 3-methyl-5-hexene halogen, 2-methyl-5-hexene halogen, 3-ethyl-5-hexene halogen, 5-hexen-2-halogen, 5-hexen-3-halogen, 5-hexen-4-halogen, 6-hepten-1-halogen, 2-methyl-6-hepten-1-halogen, 3-methyl-6-hepten-1-halogen, 4-methyl-6-hepten-1-halogen, 5-methyl-6-hepten-1-halogen, 2-ethyl-6-hepten-1-halogen, 3-ethyl-6-hepten-1-halogen, 4-ethyl-6-hepten-1-halogen, 5-ethyl-6-hepten-1-halogen, 2-methyl-7-octen-1-halogen, 3-methyl-7-octen-1-halogen, 4-methyl-7-octen-1-halogen, 5-methyl-7-octen-1-halogen, 6-methyl-7-octen-1-halogen, 3-ethyl-7-octen-1-halogen, 9-decen-1-halogen, 10-undecen-1-halogen, 11-dodecen-1-halogen, 5-chloro-1,3-pentadiene, 6-chloro-1,3-hexadiene, 5-chloro-1,3-hexadiene, 6-chloro-2,4-hexadiene, 5-chloro-2,4-hexadiene, and a mixture thereof.

* * * * *